United States Patent
Cetoli et al.

(10) Patent No.: US 12,254,272 B1
(45) Date of Patent: Mar. 18, 2025

(54) CONTEXT-AWARE SEMANTIC CHUNKING FOR INFORMATION RETRIEVAL IN LARGE LANGUAGE MODELS

(71) Applicant: Citibank, N.A., New York, NY (US)

(72) Inventors: Alberto Cetoli, London (GB); Jason Ryan Engelbrecht, London (GB); Youval Bitner, New York, NY (US); Joel Branch, New York, NY (US); John E. Ortega, New York, NY (US)

(73) Assignee: CITIBANK, N.A., NY (US)

( * ) Notice: Subject to any disclaimer, the term of this patent is extended or adjusted under 35 U.S.C. 154(b) by 0 days.

(21) Appl. No.: 18/961,440

(22) Filed: Nov. 26, 2024

Related U.S. Application Data

(63) Continuation-in-part of application No. 18/922,212, filed on Oct. 21, 2024, now Pat. No. 12,222,992.

(51) Int. Cl.
| | |
|---|---|
| *G06F 40/289* | (2020.01) |
| *G06F 40/30* | (2020.01) |
| *G06F 40/40* | (2020.01) |
| *G06N 3/042* | (2023.01) |
| *G06N 3/045* | (2023.01) |
| *G06N 3/0475* | (2023.01) |

(52) U.S. Cl.
CPC ............ *G06F 40/289* (2020.01); *G06F 40/30* (2020.01); *G06F 40/40* (2020.01); *G06N 3/042* (2023.01); *G06N 3/045* (2023.01); *G06N 3/0475* (2023.01)

(58) Field of Classification Search
CPC ........ G06F 40/289; G06F 40/40; G06F 40/30; G06N 3/042; G06N 3/045; G06N 3/0475
See application file for complete search history.

(56) References Cited

U.S. PATENT DOCUMENTS

| | | | |
|---|---|---|---|
| 11,228,505 B1* | 1/2022 | Wang | G06N 5/01 |
| 12,079,570 B1 | 9/2024 | Mondlock et al. | |
| 12,175,354 B1* | 12/2024 | Dehghanpoor | G16B 15/10 |
| 2021/0174161 A1 | 6/2021 | Perez et al. | |
| 2022/0237230 A1* | 7/2022 | Zovic | G06N 5/022 |
| 2022/0274625 A1* | 9/2022 | Garimella | G06N 3/04 |
| 2022/0374459 A1 | 11/2022 | Liu et al. | |
| 2024/0013562 A1* | 1/2024 | Montero | G06V 30/19187 |
| 2024/0097920 A1* | 3/2024 | Robertson | H04L 9/0894 |
| 2024/0403341 A1 | 12/2024 | Berglund et al. | |
| 2024/0403564 A1* | 12/2024 | Bendersky | G06F 40/30 |
| 2024/0419699 A1* | 12/2024 | Avny Brosh | G06F 40/30 |

(Continued)

*Primary Examiner* — Kevin Ky

(74) *Attorney, Agent, or Firm* — Perkins Coie LLP

(57) ABSTRACT

The systems and methods disclosed herein generate context-aware responses using semantically chunked information. The systems and methods disclosed herein partition a set of artifacts responsive to a query (e.g., a prompt for an artificial intelligence model such as a large language model) into a set of continuous chunks and associate each continuous chunk with a knowledge graph. The knowledge graph includes nodes representing chunks and edges indicating common attributes. The systems and methods disclosed herein modify node(s) in the graph by determining values of feature variables and adjusting edges in accordance with the values and generate contextualized chunks by associating or linking continuous chunks of node pairs using shared edges. The systems and methods disclosed herein use the contextualized chunks and query to generate a response using the artificial intelligence model.

20 Claims, 9 Drawing Sheets

(56) References Cited

U.S. PATENT DOCUMENTS

| | | | |
|---|---|---|---|
| 2025/0005293 A1* | 1/2025 | Nguyen | G06F 40/40 |
| 2025/0005296 A1* | 1/2025 | Goswami | G06F 40/40 |
| 2025/0013788 A1* | 1/2025 | Chen | G06F 21/629 |
| 2025/0014653 A1* | 1/2025 | Zhou | G11C 16/26 |

* cited by examiner

| User Query 102 | Semantic Similarity Ranking 202 | Intent 208 | Immunity Factor 210 | Intent Ranking 204 |
|---|---|---|---|---|
| Artifact A | 1 | X | Yes | 1 |
| Artifact B | 2 | Y | No | 3 |
| Artifact C | 3 | Z | No | 2 |
| ... | | | | |

200

206 (Artifact A, B, C)

FIG. 2

CONTEXT-AWARE SEMANTIC CHUNKING FOR INFORMATION RETRIEVAL IN LARGE LANGUAGE MODELS

CROSS-REFERENCE TO RELATED APPLICATION(S)

This application is a continuation-in-part of U.S. patent application Ser. No. 18/922,212 entitled "USING INTENT-BASED RANKINGS TO GENERATE LARGE LANGUAGE MODEL RESPONSES" filed on Oct. 21, 2024. The content of the foregoing applications is incorporated herein by reference in their entirety.

BACKGROUND

Artificial intelligence (AI) models often operate based on extensive and enormous training models. The models include a multiplicity of inputs and how each should be handled. When the model receives a new input, the model produces an output based on patterns determined from the data the model was trained on. A large language model (LLM) is a language model notable for its ability to achieve general-purpose language generation and other natural language processing tasks such as classification. LLMs can be used for text generation, a form of generative AI (e.g., GenAI, Gen AI, or GAI), by taking an input text and repeatedly predicting the next token or word. LLMs acquire these abilities by learning statistical relationships from text documents during a computationally intensive self-supervised and semi-supervised training process. Generative AI models, such as LLMs, are increasing in use and applicability over time.

An example natural language processing task, information retrieval (IR), can be used to generate responses of LLMs. IR is the task of identifying and retrieving information system resources that are relevant to (e.g., most likely to pertain to) an information need. The information to be retrieved can be specified in the form of a search query (e.g., user query). In the case of artifact retrieval, queries can be based on full-text or other content-based indexing. Information retrieval can include searching for information in a document, searching for documents themselves, and/or searching for the metadata that describes data. However, traditional IR systems often struggle with accurately chunking large documents into meaningful sections, which can result in fragmented or disjointed responses that fail to fully address the user's query.

BRIEF DESCRIPTION OF THE DRAWINGS

FIG. 2 is an illustrative diagram depicting an example environment of a set of retrieved documents ranked by intent.

Figure 1:
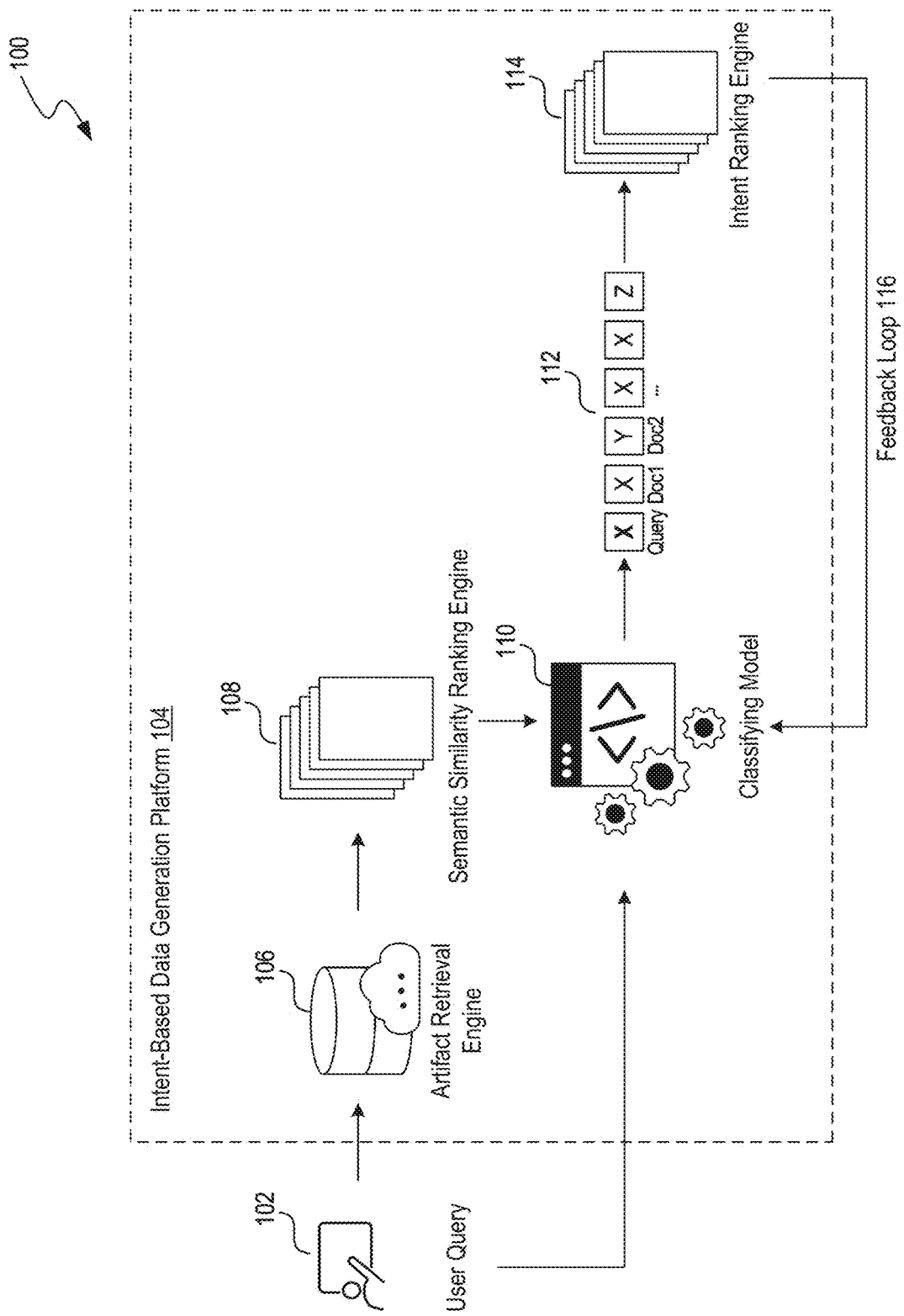
FIG. 1 is an illustrative diagram depicting an example environment of an intent-based data generation platform for ranking retrieved information of models by intent.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Due to the inherent complexity and opacity of large language models (LLMs) used in generative artificial intelligence techniques within the natural language processing (NLP) field, it becomes exceedingly difficult to understand and interpret the responses produced by the LLMs. LLMs are characterized by their extreme size, often comprising billions or more parameters. The complexity renders LLMs as "black boxes," which obscures the underlying mechanisms and decision-making processes, leading to responses that may be difficult to validate or interpret without additional transformations/filters. Thus, the responses originally output from the LLM may need further transformations into valid and reliable outputs that meet the expectations of users (e.g., subject matter experts).

One of the paradigms from NLP that can be used to generate a valid response is information retrieval (IR). IR identifies sections or chunks (e.g., textual snippets, image frames, audio snippets, etc.) from artifacts (e.g., text documents, images, audio, video) that are most likely to pertain to the original response generated by the LLM. Chunking divides an artifact into smaller, manageable pieces or chunks that can be individually used to generate a response to a query. However, conventional IR methods and systems struggle to chunk large artifacts into meaningful and contextually relevant sections. Using conventional methods, when an artifact is divided into chunks, the contextual relationships between different parts of the artifact can be lost, leading to fragmented information that may not make sense when retrieved in isolation. For instance, a chunk containing a detailed explanation of a concept may lose meaning if a chunk in the beginning of the artifact, which introduces the concept, is not retrieved alongside the chunk with the detailed explanation. The loss of context can result in responses that are disjointed and lack coherence, making it difficult for users to understand the information provided.

Furthermore, conventional IR systems often struggle with dynamically integrating and updating chunks from multiple sources, which is particularly problematic in rapidly changing fields where new information is constantly being generated/combined/linked. The inability to incorporate additional context into the chunking process can result in outdated or incomplete responses. Additionally, the linear (e.g., sequential) chunking methods commonly used in conventional IR systems, where artifacts are segmented based on simple criteria such as fixed word counts, sentence boundaries, or paragraph breaks may not adequately capture the nuanced relationships between different chunks. For example, an artifact may have sections that build upon each other, with earlier sections providing foundational knowledge used for understanding later sections, even if not directly related. If these sections are chunked linearly without considering interdependencies, the resulting chunks may be disjointed and lack the necessary context to be fully understood on their own. Moreover, linear chunking methods do not account for thematic or semantic relationships that span across different sections of an artifact. For instance, an artifact may revisit a concept multiple times, but linear chunking may separate the instances into different chunks.

Not only do conventional IR methods struggle to create chunks, but conventional IR methods also struggle to accurately rank the chunks to produce a valid response. Conventional IR methods and systems often rely on linear ranking methods, where the chunks are compared to the query based on a single metric such as semantic similarity, and ranked in descending order. While conventional approaches identify and rank the chunks that are closely related to the query based on vector calculations, conventional IR methods and systems often struggle to grasp the intent behind a user's search query, leading to the retrieval of chunks that may be relevant in a general sense but do not precisely match the user's specific needs. For example, in response to a query such as "How do I reset my password?," the conventional approach may return chunks that mention passwords in various contexts, such as password policies, password strength recommendations, or general security tips, but fail to provide specific steps needed to reset a password.

Attempting to create a system to generate valid and reliable AI model (e.g., LLM) responses in view of the available conventional approaches created significant technological uncertainty. Creating such system required addressing several unknowns in conventional approaches in IR, such as how to determine the chunk size and how to preserve the context of each artifact. Conventional chunking methods often rely on simple heuristics, such as fixed word counts or sentence boundaries, which can lead to chunks that are either too large and contain extraneous information or too small and lack sufficient context.

Unlike linear chunking methods, which simply divide the artifact based on predefined criteria (e.g., word count), context-aware chunking preserves the logical flow and coherence of the text. For example, context-aware chunking can consider factors such as the thematic structure of the artifact, the relationships between different sections, and/or the specific information needs implied by the query. However, determining the optimal chunk size and preserving context created technological uncertainty due to the inherent complexity and variability of natural language. Artifacts can vary widely in their structure and content, making it challenging to develop a one-size-fits-all approach to chunking. For example, a technical manual may require larger chunks to preserve detailed explanations, while a news article may benefit from smaller, more focused chunks. Furthermore, generating AI model responses using context-aware chunking created further technological uncertainty due to multifaceted artifacts that included multiple themes and topics. For example, an artifact on "remote work" may cover productivity tips, tools, and also legal guidelines, preventing a one-to-one matching between chunks.

To overcome the technological uncertainties, the inventors systematically evaluated multiple design alternatives. For example, the inventors tested various NLP techniques to generate valid and reliable chunks. One alternative tested included dynamic chunking methods, where the chunk size and boundaries were adjusted based on the size of the artifact but still linearly chunked. However, this approach often led to chunks that were of different sizes, but still lacked context of, for example, other chunks within the same artifact. The inventors also experimented with hierarchical chunking methods, where artifacts were divided into larger sections first and then further subdivided into smaller chunks. Although this hierarchical approach improved context preservation, the hierarchical approach still struggled with capturing context not within the artifact, such as user role, user domain, and so forth.

Thus, the inventors experimented with different methods to generate context-based semantic chunks. For example, the inventors tested various machine learning models and rule-based systems that automatically identified chunk boundaries based not only on the content but also on the relationships between different sections of the artifact or between artifacts themselves. Further, the inventors expanded the chunking process into a multi-stage process that can initially begin with a fine-grained chunking to identify small sections and then subsequently followed by using data structures such as a knowledge graph to create another set of chunks by aggregating the fine-grained chunks using injected context (e.g., context not within the artifact).

As such, the inventors have developed a system for generating AI model (e.g., LLM, ML model) responses using intent-based rankings (hereinafter the "intent-based data generation platform"). A model (e.g., embedding model, non-generative model, generative model, LLM, AI model) retrieves a set of artifacts responsive to a prompt and partitions the artifacts into chunks (or receives the pre-chunked artifacts). The model generates a first set of rankings for the chunks by creating vector representations of both the output generation request and each chunk. Next, a model of the set of models (same or different model) classifies the output generation request and each chunk with categorical labels (e.g., intent) that indicate attributes of the expected output. The model generates a second set of rankings for the chunks based on the categorical labels, ranking chunks with matching labels higher than those without matching labels. The order within the matching labels and the non-matching labels groupings are determined by the original semantic similarity metric. Thus, even among the chunks with matching labels, those that are more semantically similar to the user's query are ranked higher. Using this second set of rankings (e.g., re-ranked artifacts) and the information in the retrieved artifacts, the models generate a response to the output generation request. Unlike conventional approaches that rely solely on semantic similarity rankings or keyword matching, the disclosed systems and methods can dynamically integrate both semantic understanding and intent by employing a multi-stage process.

Further, within the intent-based data generation platform, the inventors have developed a system for generating AI model (e.g., LLM) responses using context-aware chunking (e.g., via an artifact retrieval engine of the intent-based data generation platform). The artifact retrieval engine partitions artifacts into chunks (or receives the pre-chunked artifacts). The artifact retrieval engine can associate one or more continuous chunks with a knowledge graph. The knowledge graph includes nodes representing chunks and edges indicating common attributes. The artifact retrieval engine can modify node(s) in the graph by determining values of feature variables (e.g., entities associated with the corresponding artifact, user role, user seniority, user domain, previously retrieved artifacts, and so forth) and adjusting edges in accordance with the values and generate contextualized chunks by associating or linking continuous chunks of node pairs using shared edges. Using the contextualized chunks and query, the intent-based data generation platform can generate the response.

Unlike conventional IR methods, the artifact retrieval engine uses a knowledge graph that preserves the logical flow and relationships within the artifact. The artifact retrieval engine prevents the loss of context by injecting context found within the artifact, between artifacts, and/or externally. Using a knowledge graph, the artifact retrieval engine can dynamically adjust the connections between chunks based on the chunks' shared attributes. Additionally, the artifact retrieval engine can modify the nodes and edges in the knowledge graph by determining values of feature variables, such as the importance or relevance of certain attributes, and adjusting the edges accordingly to prioritize more relevant chunks and de-emphasize less relevant ones.

While the current description provides examples related to LLMs, one of skill in the art would understand that the disclosed techniques can apply to other forms of machine learning or algorithms, including unsupervised, semi-supervised, supervised, and reinforcement learning techniques. For example, the disclosed intent-based data generation platform can evaluate model outputs from support vector machine (SVM), k-nearest neighbor (KNN), decision-making, linear regression, random forest, naïve Bayes, or logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Example Implementations of an Intent-Based Data Generation Platform

FIG. 1 is an illustrative diagram illustrating an example environment 100 of an intent-based data generation platform 104 for ranking retrieved information of models by intent. Environment 100 includes user query 102, intent-based data generation platform 104, artifact retrieval engine 106, semantic similarity ranking engine 108, classifying model 110, classified information 112, intent ranking engine 114, and feedback loop 116.

Implementations of example environment 100 can include different and/or additional components or can be connected in different ways.

The user query 102 (e.g., an output generation request, search query, input query, user request) can be the initial input provided by a user seeking information (e.g., an output) from the intent-based data generation platform 104 (e.g., an LLM, an AI model, a generative AI model). The user query 102 can be in the form of, for example, natural language text, images, videos, audio files, and so forth. For example, a user can input "How do I reset my password?" as the user query 102. The user query 102 is used by the intent-based data generation platform 104 to retrieve relevant artifacts and information (e.g., where relevance is measured by the priority of the artifact/information in intent ranking engine 114). Methods of intaking different modalities of user queries 102 (e.g., natural language text, images, videos, audio files) and/or multi-modality user queries 102 by the intent-based data generation platform 104 are discussed with reference to FIG. 3. The intent-based data generation platform 104 (e.g., information retrieval system, query processing engine, search platform) can integrate multiple functionalities, such as artifact retrieval engine 106 and classifying model 110, to deliver relevant and contextually appropriate information in response to the user query 102. Intent-based data generation platform 104 is implemented using components of example devices 800 illustrated and described in more detail with reference to FIG. 8. For instance, upon receiving the query "How do I reset my password?", the intent-based data generation platform 104 can perform and/or facilitate the retrieval of artifacts related to password reset procedures, rank the artifacts based on semantic similarity, and classify/re-rank the artifacts according to their intent using methods discussed in further detail with reference to FIG. 3.

Artifact retrieval engine 106 (e.g., information retrieval, search retrieval, document fetching) is an engine within intent-based data generation platform 104 that identifies and retrieves artifacts relevant to the user query 102 from a datastore. Artifact retrieval engine 106 can use one or more search algorithms and indexing techniques to scan through large datasets in the datastore and retrieve artifacts using the user query 102 based on, for example, keywords within the user query 102 and/or context of the user query 102. For example, artifact retrieval engine 106 can use inverted indexing and TF-IDF to rank artifacts based on their relevance to the user query 102 by identifying and indexing the terms within the user query 102 and the artifacts. Examples of inverted indexing and TF-IDF and further methods of artifact retrieval engine 106 are discussed with reference to FIG. 3.

The retrieved artifacts by artifact retrieval engine 106 can be subsequently passed on to the semantic similarity ranking engine 108 to be ranked based on their semantic content. Semantic similarity ranking engine 108 (e.g., contextual ranking, relevance ranking, semantic analysis) determines the retrieved artifacts' relevance to the user query 102 based on semantic content rather than, for example, simply keyword matching. Semantic similarity ranking engine 108 can, for example, assess the contextual similarity between the user query 102 and the retrieved artifacts to identify the context of the query and the artifacts (e.g., using word embeddings, sentence embeddings, transformer models), ensuring that artifacts discussing "password reset steps" are ranked higher for the query "How do I reset my password?" By doing so, semantic similarity ranking engine 108 ensures that the more contextually relevant artifacts are prioritized, which improves the overall accuracy and usefulness of the information provided to the user. Methods of semantic similarity ranking (e.g., vector distance metrics) are discussed with reference to FIG. 3.

The classifying model 110 (e.g., categorization model, topic classifier, content classifier) can be one or more models that classify retrieved artifacts from artifact retrieval engine 106 and user query 102 into predefined categories or topics based on one or more classifications such as intent. Classifying model 110 is the same as or similar to AI system 700 illustrated and described in more detail with reference to FIG. 3. For example, using the password example above, the classifying model 110 can classify artifacts into categories such as "password reset steps," "password policies," and/or "security tips." The classified information 112 can be used to further refine the ranking and presentation of the information to the user. Classified information 112 (e.g., categorized data, labeled information, organized content) represents the output of the classifying model 110, where the retrieved artifacts have been categorized and labeled based on their intent. This classified information 112 provides a structured and organized dataset that can be further analyzed and ranked based on the classifications assigned. For instance, artifacts classified under "password reset steps" can be ranked higher for a query focused on resetting a password due to the higher degree of alignment to the classification of the user query 102. The degree of alignment can measure how closely the content of an artifact matches the specific intent of the user's query 102.

Intent ranking engine 114 ranks the classified information 112 based on the inferred intent of the user query 102. Intent ranking engine 114 ensures that the information presented to the user is not only relevant semantically but also aligned with the user's underlying intent, providing a more personalized information retrieval. Intent, in the context of information retrieval and NLP, can refer to the underlying purpose or goal behind a user's query 102 or input and/or the retrieved artifacts, and encapsulate the user's desired outcome and/or the specific information the user is seeking to obtain. In some implementations, intent can be separated into one or more categories/classifications. For example, informational intent can refer to queries where the user seeks specific information or answers to questions (e.g., looking for factual data, explanations, procedural guidance). For example, a user query such as "What are the latest regulations on insider trading?" indicates that the user is seeking information about regulatory changes. On the other hand, navigational intent includes queries where the user aims to locate a specific location, such as a website or page. Navigational intent can be characterized by the user's knowledge of what they are looking for and their desire to navigate directly to it. For example, "Company X Firm Manual," can indicate that the user desires to access a particular section of a company's website. Transactional intent encompasses queries where the user intends to perform a specific action (e.g., making a purchase, booking a service, completing a task). For example, "Open a bank account," can indicate that the user is ready to engage in a transaction or initiate a service. Investigation intent can include queries where the user is researching products or services (e.g., with the intention of making a purchase decision). Investigation intent can be characterized by the user's need to gather information to inform their decision-making process. For example, "Best financial software for small businesses" can be categorized under investigation intent where the user is evaluating options before making a commitment. One of skill in the art would understand that the disclosed categories of intent is non-limiting, and would understand that the disclosed techniques performed by the intent-based data generation platform 104 described herein can apply to other types of intent.

The feedback loop 116 collects feedback from, for example, users, regarding the degree of adequacy/performance of the retrieved and ranked information. For instance, if a user frequently selects artifacts related to "password reset steps" after querying "How do I reset my password?", the feedback can be used to adjust future semantic similarity rankings and/or intent rankings by, for example, assigning additional weight to the artifacts related to "password reset steps" to ensure that artifacts related to "password reset steps" are prioritized and appear higher in the search results for similar queries. Methods of using feedback loop 116 to adjust future semantic similarity rankings and/or intent rankings are discussed in further detail with reference to FIG. 3.

In some implementations, the LLM is multimodal. When a user submits a user query 102 accompanied by images, the LLM can extract visual features of the images using convolutional neural networks (CNNs) or other image processing methods. For example, if a user asks, "How do I reset my password?" and includes a screenshot of the password reset page, the CNN can identify visual elements such as text fields, buttons, and instructional text. The CNN can apply a series of convolutional layers, pooling layers, and activation functions to the image, to transform the image into a feature map that captures the visual elements. In some implementations, the intent-based data generation platform 104 aligns textual tokens extracted from the text of the user query 102 with the corresponding visual features. The intent-based data generation platform 104 can assign higher relevance scores to intents that align to both the textual and visual context. For example, intents related to "password reset steps" can be prioritized over less relevant intents like "password policies" or "security tips" due to the attached image containing the password reset steps.

FIG. 2 is an illustrative diagram illustrating an example environment 200 of a set of retrieved artifacts ranked by intent. Environment 200 includes user query 102, semantic similarity ranking 202 (e.g., from semantic similarity ranking engine 108), intent ranking 204 (e.g., from intent ranking engine 114), artifacts 206, intent 208 (e.g., from classifying model 110), and immunity factor 210. Implementations of example environment 200 can include different and/or additional components or can be connected in different ways.

The artifacts 206 refer to the set of artifacts retrieved by artifact retrieval engine 106 in response to the user query 102. The artifacts 206 can be initially ranked based on their semantic similarity to the query by the semantic similarity ranking 202. For example, if the user query 102 is "How do I reset my password?", artifacts 206 can include, for example, various articles, guides, and/or frequently asked questions related to password management. For example, artifact A 206 can discuss organizational guidelines for passwords, artifact B 206 can cover unrelated password topics, and artifact C 206 can provide specific steps for resetting a password. The initial ranking based on semantic similarity does not consider the specific intent behind the query, which is subsequently addressed by the intent ranking 204.

Intent 208 refers to the classification of both the user query 102 and each artifact 206 based on their underlying intent. Examples of intent are discussed in further detail with reference to FIG. 1. The classification can be performed by the classifying model 110 in FIG. 1 to assign categorical labels indicating the intent. For instance, the query "How do I reset my password?" can be classified with the intent "password reset." Similarly, artifact C 206, which provides specific steps for resetting a password, can be classified with the same intent. Artifact A 206, which discusses organizational guidelines for passwords, can be classified with a separate intent "password policy," and artifact B 206, which covers unrelated password topics, can be classified with yet another separate intent "general password information." The intent ranking engine 114 in FIG. 1 can reorder the artifacts based on a measure of how much the artifact's intents 208 match the intent 208 of the user query 102. For example, in FIG. 2, artifact B 206 is ranked second in the semantic similarity ranking 202 but third in the intent ranking 204 because the artifact's intent does not align as closely with the query's intent as artifact C 206 does.

The immunity factor 210 ensures certain artifacts maintain a high ranking despite their intent classification. The immunity factor 210 can be applied to artifacts that satisfy predefined criteria, such as being highly authoritative or frequently accessed. For example, even if artifact A 206 has an intent 208 of "password policy" rather than "password reset," artifact A 206 can still be ranked first in the intent ranking 204 due to the immunity factor 210. The immunity factor 210 prevents the ranking of such artifacts from being lower than their ranking in the semantic similarity ranking 202. The immunity factor 210 ensures that artifacts which may not match the query's intent but are still highly relevant or authoritative (e.g., from an organizational or regulatory perspective), remain easily accessible to the user and taken into account when generating a response to the user query 102.

In some implementations, the immunity factor ensures that artifacts that are ranked high in terms of semantic similarity, but do not share the same label as the query maintain the high ranking. For example, the immunity factor can ensure that certain artifacts maintain a high ranking due to their authoritative nature, regardless of their intent classification. For example, an artifact from a regulatory body can always rank highly because of its inherent importance. In some implementations, the immunity factor can be applied to artifacts that are frequently accessed or have high user engagement to ensure that popular or commonly referenced artifacts remain prominent in search results. Additionally, in some implementations, the immunity factor can prioritize artifacts that are associated with compliance or organizational guidelines to ensure that policy artifacts are easily accessible even if the artifacts do not match the user's query intent. Furthermore, in some implementations, the immunity factor can be used to maintain the visibility of artifacts that have been manually flagged by administrators and/or users to ensure that important resources are always readily available to users. In some implementations, the immunity factor can allow the rank of certain artifacts to change but limits the extent of the change. For instance, an authoritative artifact can be allowed to move down in the rankings, but only by a limited or predefined number of positions to ensure that the artifact remains near the top of the search results. In some implementations, the predefined number of positions can be determined in the context of the total number of retrieved artifacts (e.g., cannot be within the lower fifty percentile of the rankings), or can be static (e.g., cannot be within the lower fifty artifacts ranked).

The immunity factor can be further be dynamically adjusted based on user feedback and interaction metrics to enable the intent-based data generation platform 104 to adaptively maintain the prominence of important artifacts while still responding to evolving user preferences. Additionally, the immunity factor can be applied selectively based on the context of the user query 102, such as prioritizing certain artifacts during certain periods (e.g., tax season) to ensure timely and relevant information is accessible. In some implementations, the immunity factor can prioritize artifacts that have historically been relevant to a wide range of queries to ensure that evergreen artifacts (artifacts that are constantly updated or edited) remain accessible. Artifacts validated by certain individuals and/or organizations can be assigned an immunity factor to ensure that approved content remains highly ranked. Furthermore, artifacts containing updates or recent changes in policies or procedures can be given an immunity factor to ensure users are always accessing the most current information. The immunity factor can be applied based on the user's role or access level, ensuring that artifacts relevant to specific roles (e.g., managers, compliance officers) are prioritized in their search results. In some implementations, the immunity factor can prioritize artifacts based on geographical relevance to ensure that region-specific information remains prominent for users in those areas.

For example, artifact A 206 can be ranked first in the semantic similarity ranking 202 due to its high semantic relevance but has an intent 208 of "password policy." Despite this mismatch, artifact A 206 remains ranked first in the intent ranking 204 because of the immunity factor 210. Artifact B 206, initially ranked second in the semantic similarity ranking 202, can drop to third in the intent ranking 204 because artifact B's 206 intent "general password information" does not align as closely with the query. Artifact C 206, which provides specific steps for resetting a password, can be ranked third in the semantic similarity ranking 202 but moves up to second in the intent ranking 204 due to artifact C's 206 matching intent "password reset."

Example Methods of Operation of the Intent-Based Data Generation Platform

Figure 3:
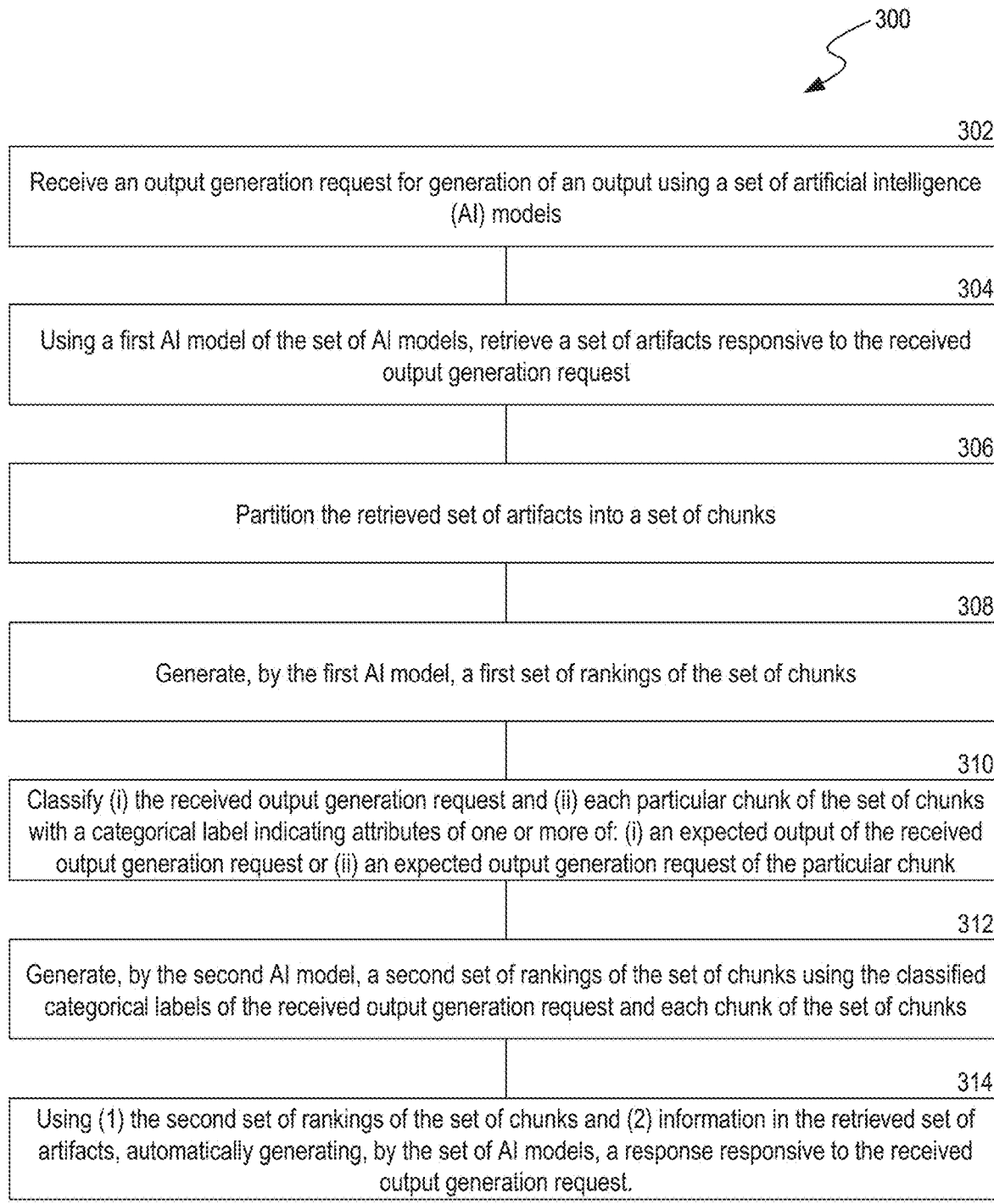
FIG. 3 is a flow diagram illustrating an example process of ranking retrieved information of models by intent.

FIG. 3 is a flow diagram illustrating a process 300 of ranking retrieved information of models by intent. In some implementations, the process 300 is performed by components of example devices 800 illustrated and described in more detail with reference to FIG. 8. Particular entities, for example, the set of AI models, are illustrated and described in more detail with reference to classifying model 110 in FIG. 1. Implementations of process 300 can include different and/or additional operations or can perform the operations in different orders.

In operation 302, the intent-based data generation platform 104 can receive, from a computing device, an output generation request (e.g., a user query 102) for generation of an output using a set of AI models. The output generation request can include a prompt (e.g., configured to be input into an LLM). One or more AI models in the set of AI models can be an LLM. In operation 304, using a first AI model of the set of AI models, the intent-based data generation platform 104 can retrieve a set of artifacts responsive to the received output generation request. For example, the intent-based data generation platform 104 can use inverted indexing and/or TF-IDF to rank artifacts based on their relevance to the output generation request by identifying and indexing the terms within the query and the artifacts. Inverted indexing enables the intent-based data generation platform 104 to locate artifacts containing the output generation request terms by creating a mapping from terms to the artifacts in which they appear. An inverted index is a data structure that stores a list of occurrences of each term across all artifacts. Meanwhile, TF-IDF a statistical measure used to evaluate how relevant a word is to an artifact in a collection of artifacts. The intent-based data generation platform 104 can calculate the term frequency (TF) to determine how often the output generation request terms appear in each artifact and the inverse document frequency (IDF) to assess the rarity of the terms across the entire artifact corpus. By multiplying these values, TF-IDF can assign higher scores to artifacts that contain the output generation request terms frequently but are not common across many artifacts.

In some implementations, the intent-based data generation platform 104 is enabled to intake different modalities of output generation requests (e.g., natural language text, images, videos, audio files) and/or multi-modality output generation requests. For natural language text queries, the intent-based data generation platform 104 can use NLP techniques to parse the text to extract the keywords and/or entities from the output generation request. Techniques such as tokenization and/or syntactic parsing can be used to break down the output generation request into its constituent parts and identify the relationships between them. Tokenization can break the output generation request into smaller units (i.e., tokens). For example, the output generation request can include a prompt, "How can I reset my password?" and be tokenized into individual words: "How", "can", "I", "reset", "my", and "password." Syntactic parsing can evaluate the grammatical structure of the text, identifying parts of speech and their relationships. In the above example, "How" is an adverb, "can" is a modal verb, "I" is a pronoun, "reset" is a verb, "my" is a possessive pronoun, and "password" is a noun, which allows the intent-based data generation platform 104 to identify the grammatical relationships, such as "I" being the subject and "reset" being the action. The intent-based data generation platform 104 can generate a structured representation of the output generation request, that captures the keywords and/or entities and their relationships. The structured representation of the query (e.g., SQL command, JSON format) can be used to search a database and retrieve a set of artifacts or information (e.g., artifact retrieval engine 106) using a corresponding database client or application programming interface (API) to send the query and retrieve the resulting artifacts.

For images within the output generation request, the intent-based data generation platform 104 can perform feature extraction using pre-trained CNNs. The extracted feature vectors can be indexed in a database (e.g., a vector database) for subsequent similarity searches. When a query is received, the intent-based data generation platform 104 can extract the feature vector of the query image using the same CNN model and transformations, and performs a similarity search using metrics like cosine similarity or Euclidean distance to find similar images in the database. For videos within the output generation request, the intent-based data generation platform 104 can extract frames at regular intervals and uses a pre-trained CNN to extract feature vectors from each frame. These features can be aggregated over time using Recurrent Neural Networks (RNNs) or 3D CNNs. The aggregated features can be indexed in a database, and for a given query, the intent-based data generation platform 104 can extract and aggregate features from the query video in the same manner as that of an image output generation request, performing a similarity search to retrieve relevant videos. For audio, the intent-based data generation platform 104 can use techniques such as Mel-frequency cepstral coefficients (MFCCs) or spectrograms to extract features (e.g., pitch, formants, zero-crossing rates) from audio signals. The features can be indexed in a database, and for a given query, the intent-based data generation platform 104 can use the extracted features from the query audio to perform a similarity search to map audio files. Multi-modal output generation requests, which can include a combination of text, images, videos, and/or audio, can be separated by the mode, and the intent-based data generation platform 104 can extract and index features from each modality separately. For a given query, the intent-based data generation platform 104 can extract features from each modality, combine them into representative vectors (e.g., weighing each modality equally or differently), and perform a similarity search to retrieve relevant multi-modal artifacts.

In operation 306, the intent-based data generation platform 104 can partition the retrieved set of artifacts into a set of chunks. Each chunk of the set of chunks can satisfy a set of predetermined criteria (e.g., a predefined size threshold). For example, a size of each chunk can be determined using a predetermined number of words, sentences, and/or paragraphs within the set of artifacts. For instance, a chunk can be limited to 800 words or 5 paragraphs. Once the criteria are established, the intent-based data generation platform 104 tokenizes the artifacts into smaller units based on the chosen criteria. If the chunking is to be done by sentences, a sentence tokenizer can be used to split the artifact into individual sentences. Similarly, if chunking by words, a word tokenizer can be used. After tokenization, the intent-based data generation platform 104 can partition the artifacts into chunks according to the predefined criteria. For example, if chunking by sentences with a maximum chunk size of 5 sentences, the sentences are grouped into chunks of 5.

In some implementations, the predefined criteria is associated with the type of content of each chunk, where each subsequent chunk of the set of chunks can include a different type of content from a previous chunk appearing prior to the subsequent chunk in the retrieved set of artifacts. The types of content can be differentiated based upon, for example, modality, context, topic, and so forth. In some implementations, the intent-based data generation platform can segment the retrieved artifacts into semantically meaningful chunks. For example, each chunk can be tailored to encapsulate a specific idea or topic, even when the idea is found in different portions of the artifact (e.g., the beginning and end). The intent-based data generation platform 104 can identify and categorize different topics within the artifacts using, for example, topic modeling, to detect and label distinct topics within the artifacts. Once the topics are identified and categorized, the intent-based data generation platform 104 can partition the artifacts into chunks where each subsequent chunk covers a different topic from the previous chunk (e.g., by maintaining a sequence of topics and ensuring that the topic of the current chunk is different from that of one or more previous chunks). For example, if the first chunk discusses "password reset," the platform ensures that the next chunk covers a different topic, such as "password policies." The intent-based data generation platform 104 can use a loop to iterate through the categorized content, creating chunks containing the same topic. If the next piece of content is on the same topic as the previous chunk, the intent-based data generation platform 104 can adjust the chunk size to include content from the piece of content.

In operation 308, the intent-based data generation platform 104 can generate, by the first AI model, a first set of rankings of the set of chunks. For example, the intent-based data generation platform 104 can generate a set of vector representations of (i) the received output generation request and/or (ii) each chunk of the set of chunks of the retrieved set of artifacts. The intent-based data generation platform 104 can use a pre-trained transformer-based model, such as Bidirectional Encoder Representations from Transformers (BERT) or Generative Pre-trained Transformer (GPT). The chunks can be fed into the AI model to produce vector representations.

For each particular chunk in the set of chunks, the intent-based data generation platform 104 can determine a distance metric value between the vector representation of the received output generation request and the vector representation of the particular chunk to measure the similarity/dissimilarity of the vectors. Distance metrics can include Euclidean distance, which measures the straight-line distance between two points in the vector space. In some implementations, the distance metric value between the vector representation of the received output generation request and the vector representation of each chunk is determined using a cosine angle between the vector representation of the received output generation request and the vector representation of each chunk. The intent-based data generation platform 104 can use the determined distance metric value between the vector representation of the received output generation request and the vector representation of the particular chunk to assign the particular chunk a ranking within the first set of rankings. Chunks with vector representations that are closer to the vector representation of the output generation request or have a higher cosine similarity (indicating higher relevance) receive higher rankings. Conversely, chunks with vector representations that are farther away receive lower rankings.

In operation 310, using a second AI model of the set of AI models, the intent-based data generation platform 104 can classify (i) the received output generation request and (ii) each particular chunk of the set of chunks with a categorical label (e.g., intent) indicating attributes of one or more of: (i) an expected output of the received output generation request or (ii) an expected output generation request of the particular chunk. In some implementations, the second AI model classifies the received output generation request using: (i) a text within the received output generation request and (ii) a pre-loaded query context within the received output generation request. In some implementations, the categorical labels are from a predefined group of categorical labels. These labels represent, for example, various possible intents, such as "summary," "analysis," or "recommendation." In some implementations, the LLM identifies the categorical labels using a sample of the set of artifacts. Once the categorical labels are identified for the sample, they can be extrapolated to the broader artifact set to enable the LLM to categorize large volumes of artifacts using lower system resources.

The second AI model can use a pre-trained transformer-based architecture, such as BERT or GPT, that has been tuned on a labeled dataset containing examples of text and their corresponding categorical labels to identify the associations between specific phrases, keywords, and the overall context of the text with the predefined labels. In some implementations, the second AI model can generate a vector representation that captures the semantic meaning of the text. For instance, in BERT, the input text is tokenized and passed through multiple transformer layers, where self-attention mechanisms compute the relationships between tokens. The output is a contextualized vector representation of the text. The vector can be mapped, in a classification layer of the second AI model, to one or more of the predefined categorical labels. The classification layer can assign probabilities to each label indicating the likelihood that the text corresponds to each possible intent (e.g., using softmax activation functions). The label with the highest probability can be selected as the classification result. The model can further refine its identification of potential categories by using additional contextual information, such as metadata indicating the artifact's source or historical data on similar queries.

In some implementations, RNNs, including their variants such as Long Short-Term Memory (LSTM), are used to classify text based on intent. RNNs trained on a labeled dataset containing examples of text and their corresponding intents can capture temporal dependencies in the request/chunks by maintaining a hidden state that is updated at each time step, allowing the model to retain information about previous inputs in the sequence. The hidden state is a vector that serves as the memory of the network, capturing information about previous inputs in the sequence. At each time step, the RNN can process an input token (e.g., a word or character) and updates its hidden state based on the current input and the previous hidden state. The update can be governed by a set of learned weights and activation functions. The final hidden state can be passed through a fully connected (i.e., dense) layer to assign probabilities to each intent (e.g., using a softmax activation function). The intent with the highest probability can be selected as the classification result.

Similarly, the intent-based data generation platform 104 can, in some implementations, use Convolutional Neural Networks (CNNs) to assign to classify text based on intent. For example, the CNN can convert the text data into word embeddings using pre-trained models such as Word2Vec or GloVe to transform words or phrases into dense vector representations. The word embeddings can be fed into the CNN, where convolutional layers apply filters to extract local features from the text (e.g., by detecting patterns such as n-grams or specific word combinations that are indicative of certain intents). The output of the convolutional layers can be passed through pooling layers, which down-sample the feature maps to reduce dimensionality. The resulting feature maps can be flattened and passed through one or more fully connected (dense) layers. Similarly to RNNs, a softmax activation function can be applied to assign probabilities to each possible intent, and the intent with the highest probability can be selected as the classification result.

In some implementations, the intent-based data generation platform 104 can classify one or more chunks of the set of chunks with multiple categorical labels (e.g., using all labels above a certain confidence threshold). The intent-based data generation platform 104 can generate the ranking of the second set of rankings of the one or more chunks using a weighted sum of the multiple categorical labels. Chunks with higher weighted sums are ranked higher, and can indicate greater relevance to the request. In some implementations, the second AI model classifies the received output generation request using a majority vote between at least two AI models of the set of AI models. Each AI model in the ensemble independently classifies the output generation request, and the final classification is determined by a majority vote. The categorical label assigned to the request can be the one that is most frequently chosen by the individual models. For example, if three AI models are used in the ensemble, and two of them classify the request as "password generation" while the third classifies it as "security advice," the majority vote would result in the request being labeled as "password generation." This approach helps to mitigate the impact of any individual model's biases or errors, leading to more reliable and accurate classifications.

In some implementations, the intent-based data generation platform 104 can cluster similar chunks or queries using clustering algorithms such as K-means, hierarchical clustering, and/or DBSCAN to organize the artifacts into distinct groups based on the artifacts' semantic similarity. Each cluster can represent a group of chunks or queries that share common characteristics. For each cluster, the categorical label is identified by determining, for example, a common intent that can be assigned to the entire cluster. For example, during runtime, when a new text (query, chunk, document) is received and the text is not pre-labeled, the intent-based data generation platform 104 can embed the text into the pre-clustered vector space using techniques such as TF-IDF, word embeddings, and/or sentence embeddings. The new text is then labeled according to the cluster the text is closest to (e.g., determined by the proximity to the cluster's center).

In operation 312, the intent-based data generation platform 104 can generate, by the second AI model, a second set of rankings of the set of chunks using the classified categorical labels of the received output generation request and each chunk of the set of chunks. To generate the rankings, the second AI model compares the categorical label of the received output generation request with the categorical labels of each chunk. For example, chunks with categorical labels matching (or above a certain degree of aligning with) the categorical label of the received output generation request can be ranked higher than chunks with categorical labels failing to match the categorical label of the received output generation request. The degree of alignment can be quantified using similarity scores or alignment metrics, which measure how well the categorical labels correspond to each other. For instance, a chunk labeled as "summary" can be highly relevant to a request also labeled as "summary," resulting in a high similarity score. The second AI model can sort the chunks based on these similarity scores, creating a ranked list where the most relevant chunks appear at the top. Chunks with categorical labels that fail to match or align closely with the label of the request receive lower similarity scores and are ranked lower in the list. Additionally, the second AI model can incorporate thresholds or degrees of alignment. For example, chunks that align above a certain threshold with the request's categorical label can be given higher priority, while those below the threshold are deprioritized.

In operation 314, using the second set of rankings of the set of chunks and information in the retrieved set of artifacts, the intent-based data generation platform 104 can automatically generate, by the set of AI models, a response responsive to the received output generation request. For example, the intent-based data generation platform 104 can determine one or more chunks of the set of chunks with a rank within the second set of rankings above a predefined rank threshold, and the response can include a summary of the one or more chunks. The response can be configured to be displayed on a user interface of the computing device.

In some implementations, responsive to one or more chunks of the set of chunks satisfying a set of predefined criteria, the intent-based data generation platform 104 can apply an immunity factor to the one or more chunks. The immunity factor can prevent the ranking of the one or more chunks in the second set of rankings from being lower than the ranking of the one or more chunks in the first set of rankings. Further examples of immunity factors are discussed with reference to FIG. 3.

Figure 4:
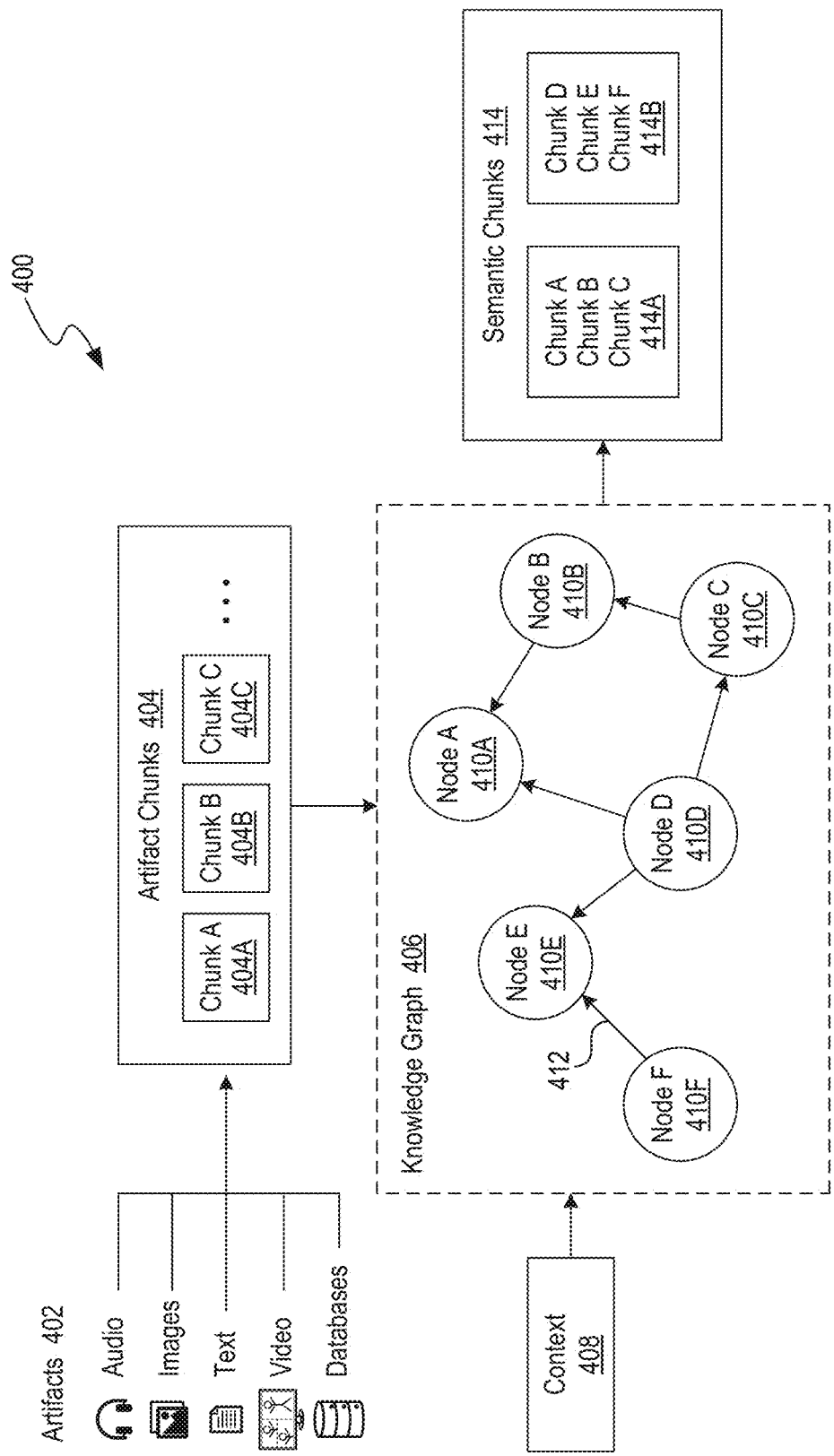
FIG. 4 is an illustrative diagram depicting an example environment of an artifact retrieval engine of the intent-based data generation platform of FIG. 1.

Example Implementations of the Artifact Retrieval Engine of the Intent-Based Data Generation Platform FIG. 4 is an illustrative diagram depicting an example environment 400 of the artifact retrieval engine 106 of the intent-based data generation platform 104 of FIG. 1 (e.g., operation 306 in FIG. 3). Environment 400 includes artifacts 402, artifact chunks 404 (e.g., a first chunk 404A, a second chunk 404B, a third chunk 404C, and so forth), knowledge graph 406, context 408, nodes 410 (e.g., a first node 410A, a second node 410B, a third node 410C, a fourth node 410D, a fifth node 410E, a sixth node 410F, and so forth), edges 412, and semantic chunks 414 (e.g., a first semantic chunk 414A, a second semantic chunk 414B, and so forth). Implementations of example environment 400 can include different and/or additional components or can be connected in different ways.

The artifact retrieval engine 106 can ingest artifacts 402 such as text files (e.g., documents), images, audio recordings, videos, databases, knowledge graphs (e.g., same as or similar to knowledge graph 406), vectors, multi-modal data (e.g., combination of text, audio, and/or video), watermarked artifacts, and other data structures/sources. An artifact refers to any piece of data or content that can be ingested and processed by a system, such as the artifact retrieval engine 106. In some implementations, artifacts 402 can be stored in one or more databases or file systems accessible to the artifact retrieval engine 106 (e.g., local storage, cloud storage, and/or external databases via APIs). For example, the artifact retrieval engine 106 can query multiple data sources to gather artifacts 402 that match the criteria specified in a query in an output generation request. Artifact chunks 404 refer to segments or portions of the original artifacts 402 that have been divided by the artifact retrieval engine 106.

In some implementations, the chunking can be performed continuously (e.g., sequentially, linearly) based on predefined criteria such as word count, sentence count, paragraph breaks, and/or semantic boundaries. For example, a document can be divided into chunks of 100 words each, ensuring that each chunk contains a complete thought or section of the document. Additionally or alternatively, the artifact retrieval engine 106 can perform non-linear chunking capture the semantic and contextual relationships within the artifacts. For example, the artifact retrieval engine 106 can divide the artifacts into chunks based on topics or themes discussed within the document. For example, a document discussing multiple topics such as "password reset procedures," "security policies," and "user account management" can be chunked into sections that each cover one of these topics, regardless of the position of the data in the document. Clustering algorithms such as K-means or hierarchical clustering can be applied to group sentences or paragraphs that are semantically similar. For example, sentences discussing similar concepts or ideas can be grouped together into a single chunk, even if they are not adjacent in the original document.

Knowledge graph 406 refers to a structured representation of the relationships between different data entities (e.g., artifact chunks 404). In some implementations, the knowledge graph 406 can use nodes to represent artifact chunks 404 and edges to represent relationships between the artifact chunks 404. The knowledge graph 406 can be dynamically updated as new artifacts 402 are added or removed, and can integrate additional external knowledge bases (e.g., context 408) to improve the contextual understanding of the artifact chunks 404. The knowledge graph 406 can represent various types of relationships, such as hierarchical, associative, and/or causal. Hierarchical relationships in the knowledge graph 406 can represent parent-child structures within documents, such as sections and subsections. Associative relationships can link chunks based on thematic or topical similarities, and causal relationships can denote cause-and-effect connections inferred from the content. The knowledge graph 406 can further include metadata about the relationships, such as the type, strength, and/or direction of the connections (e.g., timestamps to track the evolution of connections over time, confidence scores to indicate the reliability of the inferred relationships, directional indicators such as edges 412 to show the flow of information or influence between nodes).

Within the knowledge graph 406, nodes 410 can represent individual artifact chunks 404, concepts, and/or entities within the knowledge graph. In some implementations, nodes 410 can have associated attributes or properties that describe the information the nodes 410 represent. The nodes can further be weighted based on the importance or relevance of the chunk they represent. For example, a node representing a chunk that contains more significant information can be assigned a higher weight. Edges 412 can represent the relationships or connections between nodes 410 in the knowledge graph 406. In some implementations, edges 412 can be directional and have associated types or weights to indicate the nature and strength of the relationship. Each edge 412 can represent multiple relationships between nodes (e.g., capturing multiple types of connections such as "references," "is part of," "cites," or "is similar to"). In some implementations, multiple edges can be used to represent different relationships between the same pair of nodes, with each edge corresponding to a specific type of relationship. The edges 412 can enable traversal and analysis of related information in the knowledge graph 406. The weights of the edges can be adjusted dynamically using methods discussed in further detail in FIG. 6 as new information is added to the knowledge graph.

Context 408 can refer to additional information used to interpret and process the artifact chunks 404. In some implementations, context 408 can include metadata about the artifacts, user information (e.g., role, seniority, access level), domain knowledge, time of artifact creation, the source of the artifact, user interaction history, associated use cases, regulations/constraints, interaction details/history (e.g., interaction between user and artifact, interaction between artifacts), and/or other relevant factors that can influence how the artifact chunks 404 are connected in the knowledge graph 406. Context 408 can modify how the artifact chunks 404 are interpreted and connected in the knowledge graph using methods discussed further with reference to FIG. 6. For instance, machine learning algorithms can be used to adjust the weights of the edges between nodes in the knowledge graph based on the context 408. Additionally, rule-based systems can be used to apply domain-specific rules and guidelines to the interpretation and connection of artifact chunks based on the context 408.

Semantic chunks 414 can be groupings of related artifact chunks 404 based on the artifact chunks' 404 semantic meaning and context-aware relationships established in the knowledge graph 406. In some implementations, semantic chunks 414 can represent units of information that span multiple original artifact chunks 404. Unlike simple data segments, semantic chunks 414 integrate the underlying meaning and contextual connections of the artifact chunks 404. Each semantic chunk 414 can, for example, capture the full scope of a concept, topic, and/or entity by aggregating related pieces of data that share 1) semantic similarities and 2) contextual relevance.

Figure 5:
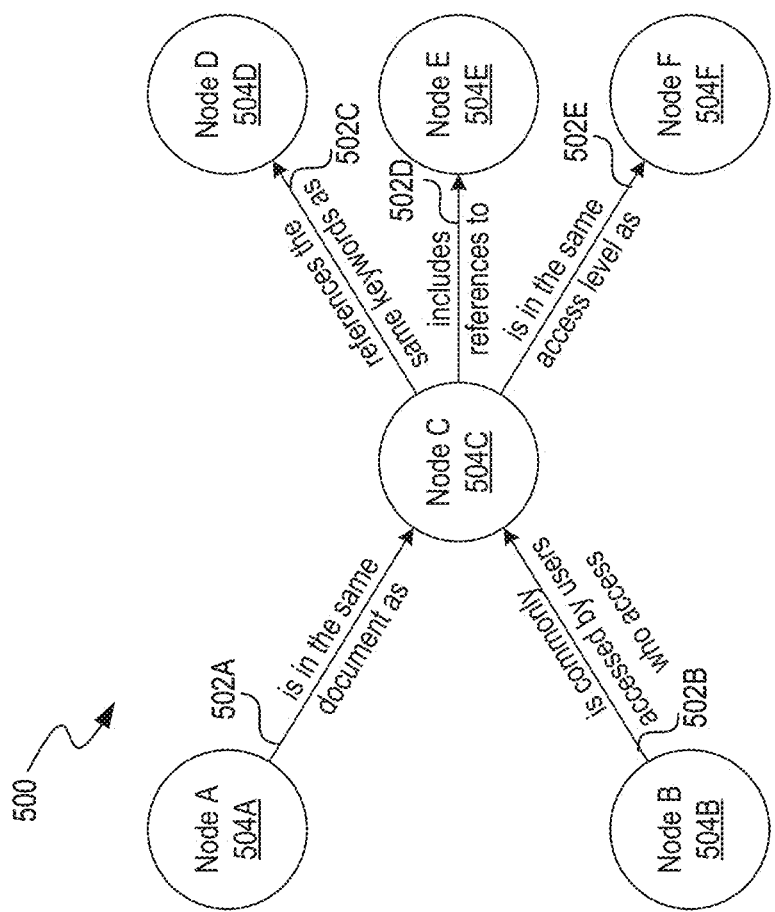
FIG. 5 is an illustrative diagram depicting an example environment of a knowledge graph used by the artifact retrieval engine of FIG. 4.

FIG. 5 is an illustrative diagram depicting a knowledge graph 500 used by the artifact retrieval engine 106 of FIG. 4. Knowledge graph 500 includes edges 502 (e.g., a first edge 502A, a second edge 502B, a third edge 502C, a fourth edge 502D, a fifth edge 502E, and so forth) and nodes 504 (e.g., a first node 504A, a second node 504B, a third node 504C, a fourth node 504D, a fifth node 504E, a sixth node 504F, and so forth). Implementations of example knowledge graph 500 can include different and/or additional components or can be connected in different ways.

The knowledge graph 500 can map each continuous chunk into a structure with nodes 504 representing the chunks and edges 502 indicating common attributes between pairs of chunks. Edges 502 are the same as or similar to edges 412 discussed in further detail with reference to FIG. 4. Nodes 504 are the same as or similar to nodes 410 discussed in further detail with reference to FIG. 4. For example, the third node 504C can be connected to multiple other nodes 504 through various relationships. The edges 502 can be weighted to indicate the strength of the relationship and/or can be directional, showing the flow of information or descriptors between nodes.

In some implementations, the edges 502 between nodes 504 can indicate artifact-based relationships. For instance, the first node 504A can be connected to the third node 504C with the first edge 502A as "is in the same document as," suggesting that the corresponding chunks of the first node 504A and the third edge 502C originate from the same source artifact. Additionally or alternatively, edges 502 can represent hierarchical relationships, such as "is a subsection of," indicating a parent-child relationship between chunks. In some cases, edges 502 can also denote temporal relationships, such as "was created after," providing a timeline of artifact creation and modification. In some cases, edges 502 can also denote temporal relationships, such as "was created after," providing a timeline of artifact creation and modification. Furthermore, edges 502 can represent version control relationships, such as "is a version of," indicating different versions of the same artifact and providing the artifact history.

The knowledge graph 500 can represent user behavior-based connections. As an example, the second node 504B can link to the third node 504C with the second edge 502B as "is commonly accessed by users who access," potentially indicating a pattern of user interactions with the artifacts corresponding the second node 504B and the third node 504C. In some implementations, the behavior-based connections can be derived from user interaction logs, clickstream data, and/or access history. Additionally, edges 502 can represent collaborative relationships, such as "was edited by the same user as," indicating that multiple users have interacted with the same chunks. User behavior-based connections can include "is frequently co-accessed with," indicating that certain chunks are often accessed together, indicating a strong contextual or thematic link.

Content-based relationships can be depicted in the knowledge graph 500. The third node 504C can connect to the fourth node 504D with the third edge 502C as "references the same keywords as," suggesting a similarity in the content or subject matter between the corresponding chunks of the third node 504C and the fourth node 504D. In some implementations, the knowledge graph 500 can include referential relationships. For example, the third node 504C can link to the fifth node 504E with the fourth edge 502D as "includes references to," indicating that one chunk (i.e., represented by the third node 504C) contains citations or references to content in another chunk (i.e., represented by the fifth node 504F). The referential relationships can be identified using citation patterns, bibliographic data, and/or hyperlink structures within the artifacts. Additionally, edges 502 can represent cross-references, such as "is cross-referenced by," indicating that chunks refer to each other in a bidirectional manner.

The knowledge graph 500 can represent access or permission-based relationships between chunks. As shown, the third node 504C connects to the fifth node 504F with the fifth edge 502E as "is in the same access level as," suggesting that the corresponding chunks of the third node 504C and the fifth node 504F have similar security or visibility settings. In some implementations, the access-based relationships can be derived from access control lists (ACLs), user roles, and/or security policies. Additionally, edges 502 can represent ownership relationships, such as "is owned by the same user as," indicating that chunks are managed or controlled by the same user or group.

The nodes in the knowledge graph 500 can be modified by determining values of a set of feature variables using the corresponding artifact of each continuous chunk. The feature variables can include context not found within the chunk and/or corresponding artifact such as entities associated with the corresponding artifact, user role, user seniority, user domain, previously retrieved artifacts, and so forth. Using the values of these feature variables, the artifact retrieval engine 106 can perform operations such as adding, altering, and/or removing edges corresponding to each chunk in the knowledge graph, discussed in further detail with reference to FIG. 6.

Figure 6:
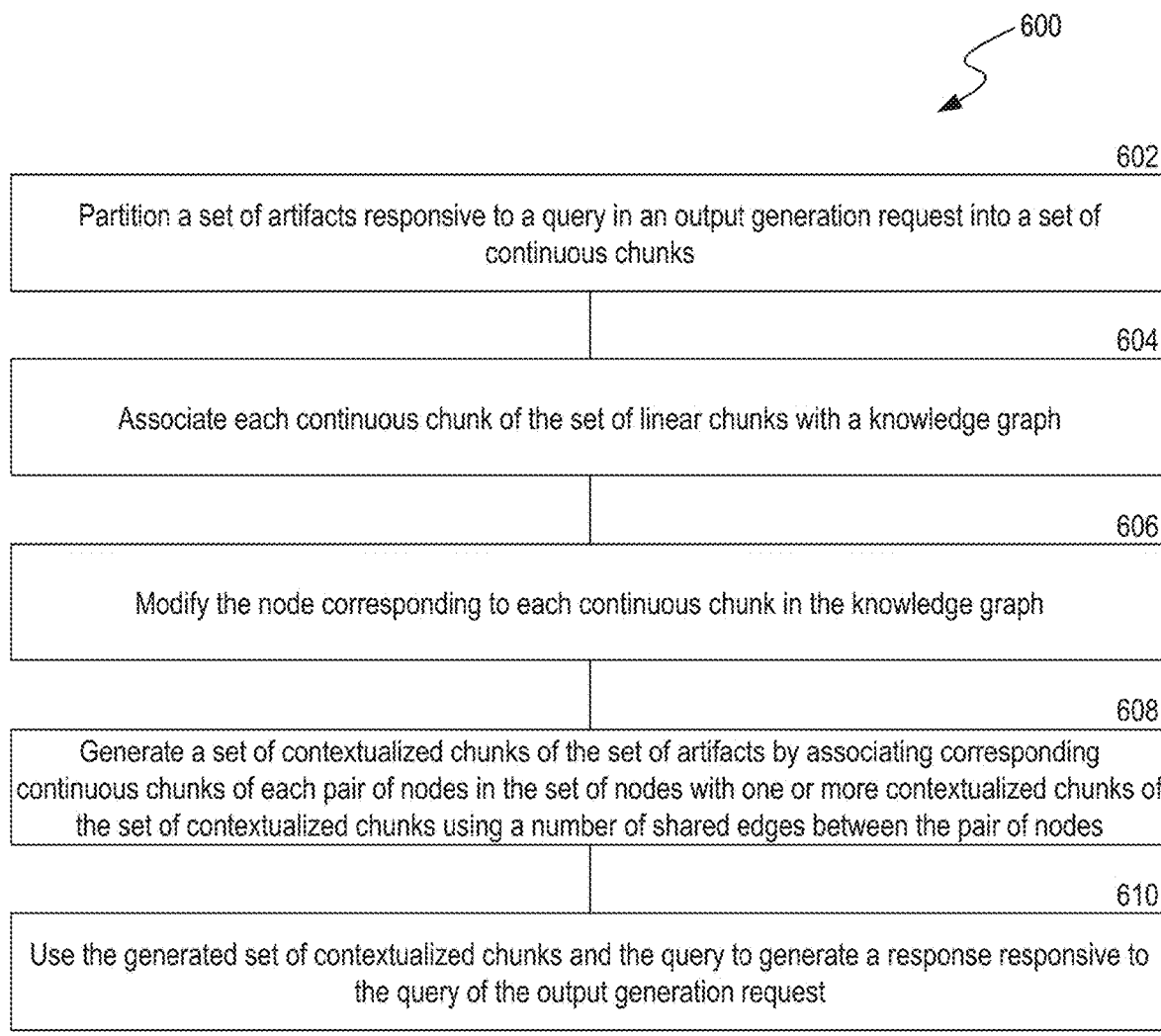
FIG. 6 is a flow diagram illustrating an example process of generating context-aware responses using semantically chunked information.

Example Methods of Operation of the Artifact Retrieval Engine of the Intent-Based Data Generation Platform FIG. 6 is a flow diagram illustrating an example process 600 of generating context-aware responses using semantically chunked information. In some implementations, the process 600 is performed by components of example devices 800 illustrated and described in more detail with reference to FIG. 8. Particular entities, for example, the AI model, are illustrated and described in more detail with reference to knowledge graph 406 in FIG. 4. Implementations of process 600 can include different and/or additional operations or can perform the operations in different orders.

The artifact retrieval engine 106 can retrieve/obtain (e.g., from a computing device) a set of artifacts (e.g., documents) responsive to a query (e.g., prompt) in an output generation request. In operation 602, the artifact retrieval engine 106 partitions a set of artifacts (e.g., artifacts 402 in FIG. 4) responsive to a query in an output generation request into a set of continuous chunks (e.g., artifact chunks 404 in FIG. 4). Each continuous chunk of the set of continuous chunks can be a section of consecutive data within a predefined size threshold. In some implementations, a size of each continuous chunk is determined using a predetermined number of one or more of: words, sentences, and/or paragraphs within the set of artifacts.

In some implementations, for artifacts that include images (e.g., video), the artifact retrieval engine 106 can divide a large image or a sequence of images (e.g., frames from a video) into smaller, contiguous regions or tiles by splitting the image into a grid of equal-sized blocks, where each block contains a portion of the image. For audio, the artifact retrieval engine 106 can segment the audio stream into continuous chunks based on time intervals or natural breaks in the audio signal, such as pauses or changes in speaker. For video, the engine can partition the video into continuous chunks by dividing the video into segments based on frame counts or scene changes. Each chunk can be annotated with artifact-specific metadata such as timestamps, frame numbers, and/or scene identifiers.

In operation 604, the artifact retrieval engine 106 associates (e.g., links, maps) each continuous chunk of the set of continuous chunks with a knowledge graph including: (i) a set of nodes representing each continuous chunk, and (ii) a set of edges between the set of nodes indicating one or more common attributes between pairs of continuous chunks. In some implementations, the artifact retrieval engine 106 creates a node for each continuous chunk by assigning a unique identifier to each chunk and storing relevant metadata (i.e., attributes), such as the chunk's content, source artifact, and/or position within the artifact. The artifact retrieval engine 106 can identify common attributes between chunks that can be used to establish edges between nodes. The attributes can include, for example, keywords, topics, entities, and/or other semantic features. For example, the artifact retrieval engine 106 can use NLP to extract keywords from each chunk. Chunks that share common keywords can be linked with an edge in the knowledge graph. The edge can be annotated with the specific keywords that the chunks have in common.

In some implementations, the artifact retrieval engine 106 can use machine learning algorithms to identify common attributes and establish edges. For instance, a clustering algorithm can be applied to group chunks based on their semantic similarity. Chunks within the same cluster can be linked with edges in the knowledge graph. The similarity scores calculated by the algorithm can be used to weight the edges, indicating the strength of the relationship between chunks. In some implementations, user-defined rules or criteria can be used to establish edges between nodes. Users can specify the attributes that should be used to link chunks, such as specific keywords, topics, and/or entities. The artifact retrieval engine 106 can parse the chunks for these attributes and creates edges accordingly.

In addition to using a knowledge graph, other implementations for associating continuous chunks can involve simpler data structures or alternative models. For example, one such implementation is a hash map or dictionary, where each continuous chunk is stored as a key-value pair. The key represents the unique identifier of the chunk, and the value contains metadata and attributes such as keywords, topics, and/or entities. In some implementations, the artifact retrieval engine 106 can use a relational database to associate the chunks with, where each chunk is represented as a row in a table, and columns store various attributes and relationships. Additionally or alternatively, each chunk can be represented as a vector in a high-dimensional space. Similarity between chunks can be measured using cosine similarity or other distance metrics, and chunks with high similarity scores can be grouped together. Furthermore, a linked list or graph-based data structure can be used to represent chunks and their relationships, where each node in the list or graph represents a chunk, and edges or pointers indicate relationships based on predefined criteria set by the user.

In operation 606, the artifact retrieval engine 106 modifies a node in the set of nodes corresponding to each continuous chunk in the knowledge graph by determining values of a set of feature variables using a corresponding artifact of the continuous chunk. The set of feature variables can include, for example, entities associated with the corresponding artifact, user role, user seniority, user domain, and/or previously retrieved artifacts. The artifact retrieval engine 106 uses the values of the set of feature variables to add, alter, and/or remove a corresponding set of edges of the node corresponding to the continuous chunk in the knowledge graph.

In some implementations, the artifact retrieval engine 106 uses NLP techniques such as named entity recognition (NER) to identify and classify entities such as names of people, organizations, locations, dates, and so forth. The entities can be stored as feature variables associated with the node representing the continuous chunk. For example, if the artifact mentions "John Doe," the entity "John Doe" can be added to the node's feature set. Additionally, the artifact retrieval engine 106 can incorporate user-specific information such as user role, user seniority, user domain, and so forth, retrieved from user profiles or session data. For instance, if the user uploading the artifact (e.g., the author) or the user inputting a query is a senior manager in the finance domain, the information can be added to the node's feature variables. The artifact retrieval engine 106 can consider the user's interaction history by maintaining a log of artifacts the user has accessed and identifying patterns or trends. For example, if the user frequently retrieves artifacts related to "financial reports," the interest can be recorded as a feature variable. In some implementations, the set of feature variables includes one or more patterns of artifact citations to the prompt by users in specific roles.

Once the feature variables are determined, the artifact retrieval engine 106 updates the edges of the node. If a new entity is identified, the artifact retrieval engine 106 can create a new edge linking the node to other nodes that share the same entity. For example, if "John Doe" is a common entity between two chunks, the artifact retrieval engine 106 can create an edge between their corresponding nodes. Conversely, if an entity is no longer relevant, the artifact retrieval engine 106 can remove the corresponding edge. For example, if an entity is no longer mentioned in updated versions of the artifact, the edges associated with that entity can be deleted to prevent outdated or irrelevant connections from cluttering the knowledge graph. The artifact retrieval engine 106 can, in some implementations, modify existing edges by updating the existing edges' weights or annotations based on the new feature variables. For instance, if the user's interest in "financial reports" increases, the weight of edges connecting related nodes can be adjusted to reflect the change.

In some implementations, the artifact retrieval engine 106 can retrieve (i) a principal artifact and (ii) a set of amendments on the principal artifact. One or more amendments can be mapped to a portion of the principal artifact, indicating the section or content that the amendment modifies. The set of amendments can be ranked in accordance with a time of each amendment. The artifact retrieval engine 106 can modify the node corresponding to a particular continuous chunk using amendments in the set of amendments with the time earlier than a time of the continuous chunk. To modify the nodes, the artifact retrieval engine 106 can rank the amendments in accordance with the time of each amendment based on their timestamps (e.g., from the earliest to the most recent). The artifact retrieval engine 106 can, using the previously retrieved artifacts, add one or more edges in the knowledge graph between one or more continuous chunks within the previously retrieved artifacts.

The artifact retrieval engine 106 can identify the continuous chunk within the principal artifact that corresponds to the node in the knowledge graph and identify one or more amendments made before the timestamp of the continuous chunk. For each identified amendment, the artifact retrieval engine 106 can update the node's feature variables to reflect the changes introduced by the amendment, by, for example, adding new entities, updating existing attributes, and/or removing outdated information. For example, if an amendment introduces a new entity such as a person's name or a new term, the entity can be added to the node's feature set. If an amendment updates an existing entity, such as changing a date or correcting a name, the node's attributes can be updated accordingly. If an amendment removes an entity, the corresponding attribute can be deleted from the node.

In operation 608, the artifact retrieval engine 106 generates a set of contextualized chunks of the set of artifacts by associating corresponding continuous chunks of each pair of nodes in the set of nodes with one or more contextualized chunks of the set of contextualized chunks using a number of shared edges between the pair of nodes. For example, the artifact retrieval engine 106, for each pair of nodes in the set of nodes, can determine whether the pair of nodes should be merged using a number of shared edges between the pair of nodes.

In some implementations, the artifact retrieval engine 106 calculates the number of shared edges for each pair of nodes by traversing the graph and counting the edges that connect the nodes. For example, if two nodes share multiple edges representing common entities, the artifact retrieval engine 106 can recognize that the two nodes are closely related. The artifact retrieval engine 106 can determine whether the pair of nodes should be merged based on a predefined threshold for the number of shared edges. If the number of shared edges exceeds the threshold, the nodes are considered for merging.

Once the artifact retrieval engine 106 identifies pairs of nodes to be merged, the artifact retrieval engine 106 can associate corresponding continuous chunks of the pair of nodes to a common contextualized chunk of the set of contextualized chunks by creating a new contextualized chunk that combines (e.g., aggregates) the content and attributes of the continuous chunks from both nodes. In some implementations, the artifact retrieval engine 106 uses NLP techniques to merge the content of the continuous chunks by identifying overlapping or redundant information and combining the content in a coherent manner. For example, if both chunks contain similar sentences or paragraphs, the artifact retrieval engine 106 can merge the chunks into a single, unified text free of duplication.

Once the contextualized chunks are generated, the artifact retrieval engine 106 updates the knowledge graph to reflect the new associations by creating new nodes for the contextualized chunks and establishing edges based on their relationships with other nodes. For example, the artifact retrieval engine 106 re-evaluates the edges connected to the original nodes, adjusting their weights and annotations to reflect the new context. For instance, if the merged chunk contains entities or topics from both original chunks, the edges can be updated to indicate the combined relevance and strength of the relationships.

In operation 610, the artifact retrieval engine 106 uses the generated set of contextualized chunks and the query to generate (e.g., via the intent-based data generation platform 104), by a set of AI models, a response responsive to the query of the output generation request. For example, the intent-based data generation platform 104 can use tokenization, part-of-speech tagging, and/or NER to break down the query into its constituent parts and identify entities, keywords, and/or phrases. For example, if the query is "What are the latest financial reports for Corporation X?,"

the intent-based data generation platform 104 can identify "latest financial reports" and "Corporation X" as keywords. The intent-based data generation platform 104 can match the query with the generated set of contextualized chunks by searching the chunks for relevant information that matches the query's keywords. For example, the intent-based data generation platform 104 can use cosine similarity to measure the semantic similarity between the query and the chunks.

Once the relevant chunks are identified, the intent-based data generation platform 104 can use the set of AI models to generate the response. The AI models can include machine learning models, deep learning models, natural language generation (NLG) models, and so forth. The models can be trained on large datasets to understand the context and generate coherent and relevant responses. For example, a transformer-based model like GPT-4 can be used to generate natural language responses based on the input chunks and query. The AI models can combine the information from the chunks and synthesize the information. Once the response is generated, the intent-based data generation platform 104 can configure the response to be displayed at a user interface of the computing device. For example, the response can be displayed in a structured format with headings, bullet points, and/or hyperlinks to relevant artifacts.

In some implementations, the artifact retrieval engine 106 can map each guideline of a set of guidelines to one or more continuous chunks of the set of continuous chunks. In some implementations, the artifact retrieval engine 106 breaks down the guidelines into the guidelines' constituent parts and identifies particular entities, keywords, and/or phrases using similar methods as it used for the chunks. The artifact retrieval engine 106 can identify relevant chunks that correspond to the guidelines and create associations between the guidelines and the chunks, ensuring that each guideline is linked to the relevant sections of the artifacts (e.g., using same or similar methods as it used for the chunks). The artifact retrieval engine 106 can store the mappings in a structured format, such as a database or a knowledge graph. For example, the artifact retrieval engine 106 can create a table where each row represents a guideline and each column represents a linked chunk, with cells indicating the presence of a mapping. The generated response can indicate the mapped guidelines of the contextualized chunks used to generate the response. For example, the response can include annotations or footnotes that reference the guidelines, and/or the response can organize the content into sections based on the guidelines.

In some implementations, the artifact retrieval engine 106 can retrieve content from one or more external knowledge bases using the common attributes of the set of continuous chunks. For example, the artifact retrieval engine 106 can query one or more databases, online repositories, and/or other sources of structured and unstructured information. The artifact retrieval engine 106 can construct queries based on the common attributes (e.g., including the common attributes as keywords) and sends them to the external knowledge bases to retrieve relevant content. The artifact retrieval engine 106 can embed the retrieved content into the knowledge graph by adding at least one or more of: a set of new nodes or a set of new edges representing the external content.

In some implementations, the generated response can trigger an automatic programmatic workflow performed by the intent-based data generation platform, for example, by integrating with automation tools and systems through APIs and event-driven architectures. For instance, the response can include specific triggers or metadata that signal the initiation of predefined workflows. The triggers can be based on the content of the response or user query, such as keywords, entities, or specific instructions. For example, if the response includes a recommendation to reset a password, the response can automatically trigger a workflow in an IT service management system to initiate the password reset process. The programmatic workflow can include sending an email to the user with reset instructions, updating the user's account status in the database, and/or logging the action for audit purposes.

Furthermore, the contextualized chunks can dynamically adjust the actions based on the injected context. For example, if the contextualized chunks reveal that the user has previously attempted to reset their password multiple times unsuccessfully, the workflow can be adjusted to include additional steps, such as escalating the issue to a support specialist or provide more detailed instructions. Using the context provided by the contextualized chunks, the intent-based data generation platform can ensure that the automated workflows are not only triggered but also executed in a manner specific to the needs and circumstances of the user.

Figure 7:
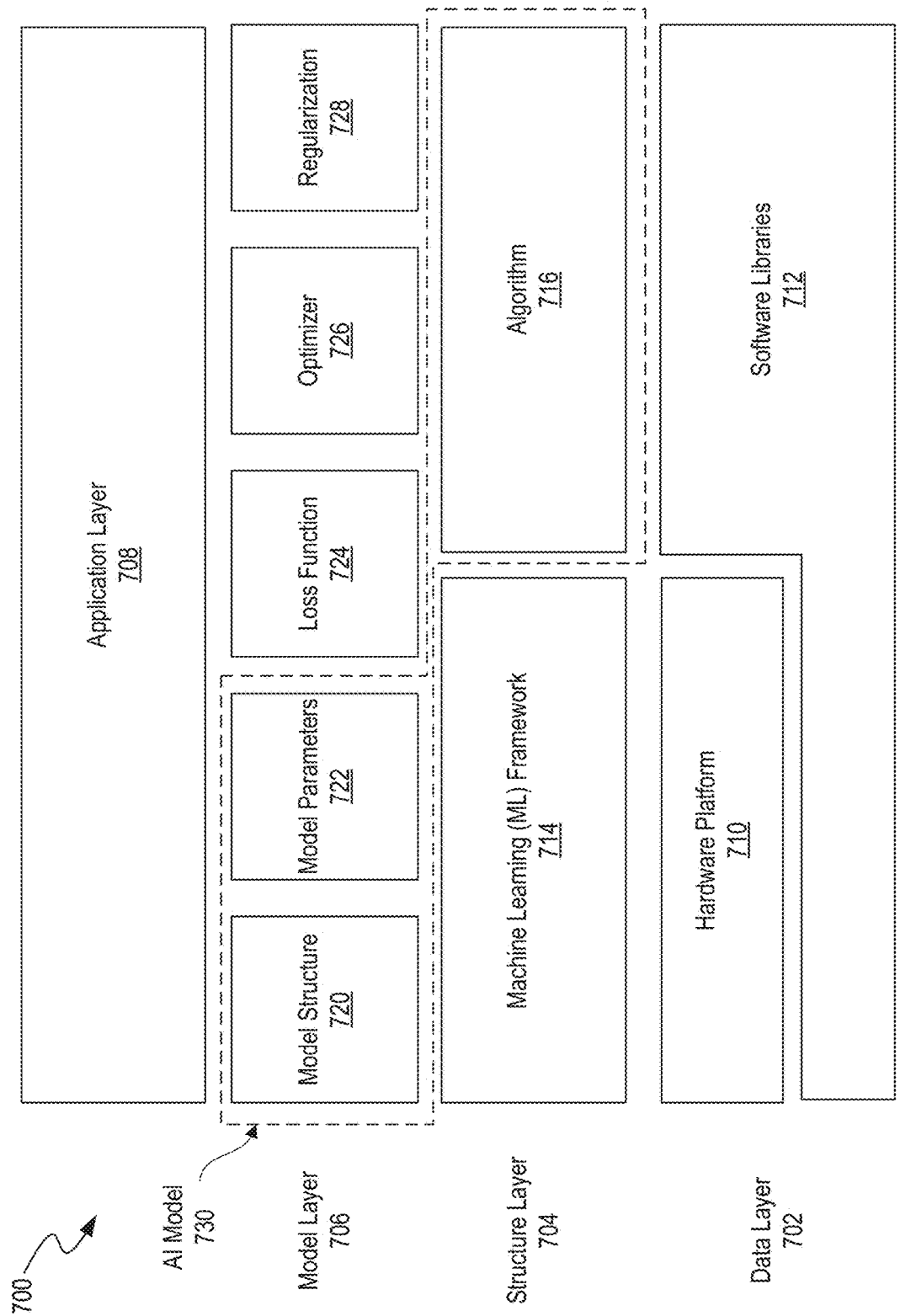
FIG. 7 illustrates a layered architecture of an artificial intelligence (AI) model system that can implement the machine learning models of the intent-based data generation platform of FIG. 1, in accordance with some implementations of the present technology.

Example Implementation of the Models of the Intent-Based Data Generation Platform FIG. 7 illustrates a layered architecture of an AI system 700 that can implement the ML models of the intent-based data generation platform 104 of FIG. 1, in accordance with some implementations of the present technology. Example ML models can include the models executed by the intent-based data generation platform 104, such as classifying model 110. Accordingly, the classifying model 110 can include one or more components of the AI system 700.

As shown, the AI system 700 can include a set of layers, which conceptually organize elements within an example network topology for the AI system's architecture to implement a particular AI model. Generally, an AI model is a computer-executable program implemented by the AI system 700 that analyses data to make predictions. Information can pass through each layer of the AI system 700 to generate outputs for the AI model. The layers can include a data layer 702, a structure layer 704, a model layer 706, and an application layer 708. The algorithm 716 of the structure layer 704 and the model structure 720 and model parameters 722 of the model layer 706 together form an example AI model. The optimizer 726, loss function engine 724, and regularization engine 728 work to refine and optimize the AI model, and the data layer 702 provides resources and support for application of the AI model by the application layer 708.

The data layer 702 acts as the foundation of the AI system 700 by preparing data for the AI model. As shown, the data layer 702 can include two sub-layers: a hardware platform 710 and one or more software libraries 712. The hardware platform 710 can be designed to perform operations for the AI model and include computing resources for storage, memory, logic and networking, such as the resources described in relation to FIGS. 8 and 9. The hardware platform 710 can process amounts of data using one or more servers. The servers can perform backend operations such as matrix calculations, parallel calculations, machine learning (ML) training, and the like. Examples of servers used by the hardware platform 710 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 710 can include computing resources, (e.g., servers, memory, etc.) offered by a cloud services provider. The hardware platform 710 can also include computer memory for storing data about the AI model, application of the AI model, and training data for the AI model. The computer memory can be a form of random-access memory (RAM), such as dynamic RAM, static RAM, and non-volatile RAM.

The software libraries 712 can be thought of suites of data and programming code, including executables, used to control the computing resources of the hardware platform 710. The programming code can include low-level primitives (e.g., fundamental language elements) that form the foundation of one or more low-level programming languages, such that servers of the hardware platform 710 can use the low-level primitives to carry out specific operations. The low-level programming languages do not require much, if any, abstraction from a computing resource's instruction set architecture, enabling them to run quickly with a small memory footprint. Examples of software libraries 712 that can be included in the AI system 700 include INTEL Math Kernel Library, NVIDIA cuDNN, EIGEN, and OpenBLAS.

The structure layer 704 can include an ML framework 714 and an algorithm 716. The ML framework 714 can be thought of as an interface, library, or tool that enables users to build and deploy the AI model. The ML framework 714 can include an open-source library, an API, a gradient-boosting library, an ensemble method, and/or a deep learning toolkit that work with the layers of the AI system facilitate development of the AI model. For example, the ML framework 714 can distribute processes for application or training of the AI model across multiple resources in the hardware platform 710. The ML framework 714 can also include a set of pre-built components that have the functionality to implement and train the AI model and enable users to use pre-built functions and classes to construct and train the AI model. Thus, the ML framework 714 can be used to facilitate data engineering, development, hyperparameter tuning, testing, and training for the AI model. Examples of ML frameworks 714 that can be used in the AI system 700 include TENSORFLOW, PYTORCH, SCIKIT-LEARN, KERAS, LightGBM, RANDOM FOREST, and AMAZON WEB SERVICES.

The algorithm 716 can be an organized set of computer-executable operations used to generate output data from a set of input data and can be described using pseudocode. The algorithm 716 can include complex code that enables the computing resources to learn from new input data and create new/modified outputs based on what was learned. In some implementations, the algorithm 716 can build the AI model through being trained while running computing resources of the hardware platform 710. This training enables the algorithm 716 to make predictions or decisions without being explicitly programmed to do so. Once trained, the algorithm 716 can run at the computing resources as part of the AI model to make predictions or decisions, improve computing resource performance, or perform tasks. The algorithm 716 can be trained using supervised learning, unsupervised learning, semi-supervised learning, and/or reinforcement learning.

Using supervised learning, the algorithm 716 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., in the form of user query 102 in FIG. 1) from various source computing systems described in relation to FIG. 1. Furthermore, training data can include pre-processed data generated by various engines of the intent-based data generation platform 104 described in relation to FIG. 1. The user may label the training data based on one or more classes and trains the AI model by inputting the training data to the algorithm 716. The algorithm determines how to label the new data based on the labeled training data. The user can facilitate collection, labeling, and/or input via the ML framework 714. In some instances, the user may convert the training data to a set of feature vectors for input to the algorithm 716. Once trained, the user can test the algorithm 716 on new data to determine if the algorithm 716 is predicting accurate labels for the new data. For example, the user can use cross-validation methods to test the accuracy of the algorithm 716 and retrain the algorithm 716 on new training data if the results of the cross-validation are below an accuracy threshold.

Supervised learning can include classification and/or regression. Classification techniques include teaching the algorithm 716 to identify a category of new observations based on training data and are used when input data for the algorithm 716 is discrete. Said differently, when learning through classification techniques, the algorithm 716 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 716 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques include estimating relationships between independent and dependent variables and are used when input data to the algorithm 716 is continuous. Regression techniques can be used to train the algorithm 716 to predict or forecast relationships between variables. To train the algorithm 716 using regression techniques, a user can select a regression method for estimating the parameters of the model. The user collects and labels training data that is input to the algorithm 716 such that the algorithm 716 is trained to understand the relationship between data features and the dependent variable(s). Once trained, the algorithm 716 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 716 learns patterns from unlabeled training data. In particular, the algorithm 716 is trained to learn hidden patterns and insights of input data, which can be used for data exploration or for generating new data. Here, the algorithm 716 does not have a predefined output, unlike the labels output when the algorithm 716 is trained using supervised learning. Said another way, unsupervised learning is used to train the algorithm 716 to find an underlying structure of a set of data, group the data according to similarities, and represent that set of data in a compressed format. The intent-based data generation platform 104 can use unsupervised learning to identify patterns in claim history (e.g., to identify particular event sequences) and so forth. In some implementations, performance of the classifying model 110 that can use unsupervised learning is improved because the incoming user query 102 is pre-processed and reduced, based on the relevant triggers, as described herein.

A few techniques can be used in supervised learning: clustering, anomaly detection, and techniques for learning latent variable models. Clustering techniques include grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 716 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 716 may be trained to be an Isolation Forest, local outlier factor (LOF) algorithm, or K-nearest neighbor (k-NN) algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that may be used by the algorithm 716 include factor analysis, item response theory, latent profile analysis, and latent class analysis.

The model layer 706 implements the AI model using data from the data layer and the algorithm 716 and ML framework 714 from the structure layer 704, thus enabling decision-making capabilities of the AI system 700. The model layer 706 includes a model structure 720, model parameters 722, a loss function engine 724, an optimizer 726, and a regularization engine 728.

The model structure 720 describes the architecture of the AI model of the AI system 700. The model structure 720 defines the complexity of the pattern/relationship that the AI model expresses. Examples of structures that can be used as the model structure 720 include decision trees, support vector machines, regression analyses, Bayesian networks, Gaussian processes, genetic algorithms, and artificial neural networks (or, simply, neural networks). The model structure 720 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 720 may include one or more hidden layers of nodes between the input and output layers. The model structure 720 can be an Artificial Neural Network (or, simply, neural network) that connects the nodes in the structured layers such that the nodes are interconnected. Examples of neural networks include Feed-forward Neural Networks, convolutional neural networks (CNNs), Recurrent Neural Networks (RNNs), Autoencoder, and Generative Adversarial Networks (GANs).

The model parameters 722 represent the relationships learned during training and can be used to make predictions and decisions based on input data. The model parameters 722 can weight and bias the nodes and connections of the model structure 720. For instance, when the model structure 720 is a neural network, the model parameters 722 can weight and bias the nodes in each layer of the neural networks, such that the weights determine the strength of the nodes and the biases determine the thresholds for the activation functions of each node. The model parameters 722, in conjunction with the activation functions of the nodes, determine how input data is transformed into desired outputs. The model parameters 722 can be determined and/or altered during training of the algorithm 716.

The loss function engine 724 can determine a loss function, which is a metric used to evaluate the AI model's performance during training. For instance, the loss function engine 724 can measure the difference between a predicted output of the AI model and the actual output of the AI model and is used to guide optimization of the AI model during training to minimize the loss function. The loss function may be presented via the ML framework 714, such that a user can determine whether to retrain or otherwise alter the algorithm 716 if the loss function is over a threshold. In some instances, the algorithm 716 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 726 adjusts the model parameters 722 to minimize the loss function during training of the algorithm 716. In other words, the optimizer 726 uses the loss function generated by the loss function engine 724 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 726 used may be determined based on the type of model structure 720 and the size of data and the computing resources available in the data layer 702.

The regularization engine 728 executes regularization operations. Regularization is a technique that prevents over- and under-fitting of the AI model. Overfitting occurs when the algorithm 716 is overly complex and too adapted to the training data, which can result in poor performance of the AI model. Underfitting occurs when the algorithm 716 is unable to recognize even basic patterns from the training data such that it cannot perform well on training data or on validation data. The optimizer 726 can apply one or more regularization techniques to fit the algorithm 716 to the training data properly, which helps constraint the resulting AI model and improves its ability for generalized application. Examples of regularization techniques include lasso (L1) regularization, ridge (L2) regularization, and elastic (L1 and L2 regularization).

The application layer 708 describes how the AI system 700 is used to solve problem or perform tasks. In an example implementation, the application layer 708 can include a front-end user interface of the intent-based data generation platform 104.

Example Computing Environment of the Intent-Based Data Generation Platform

Figure 8:
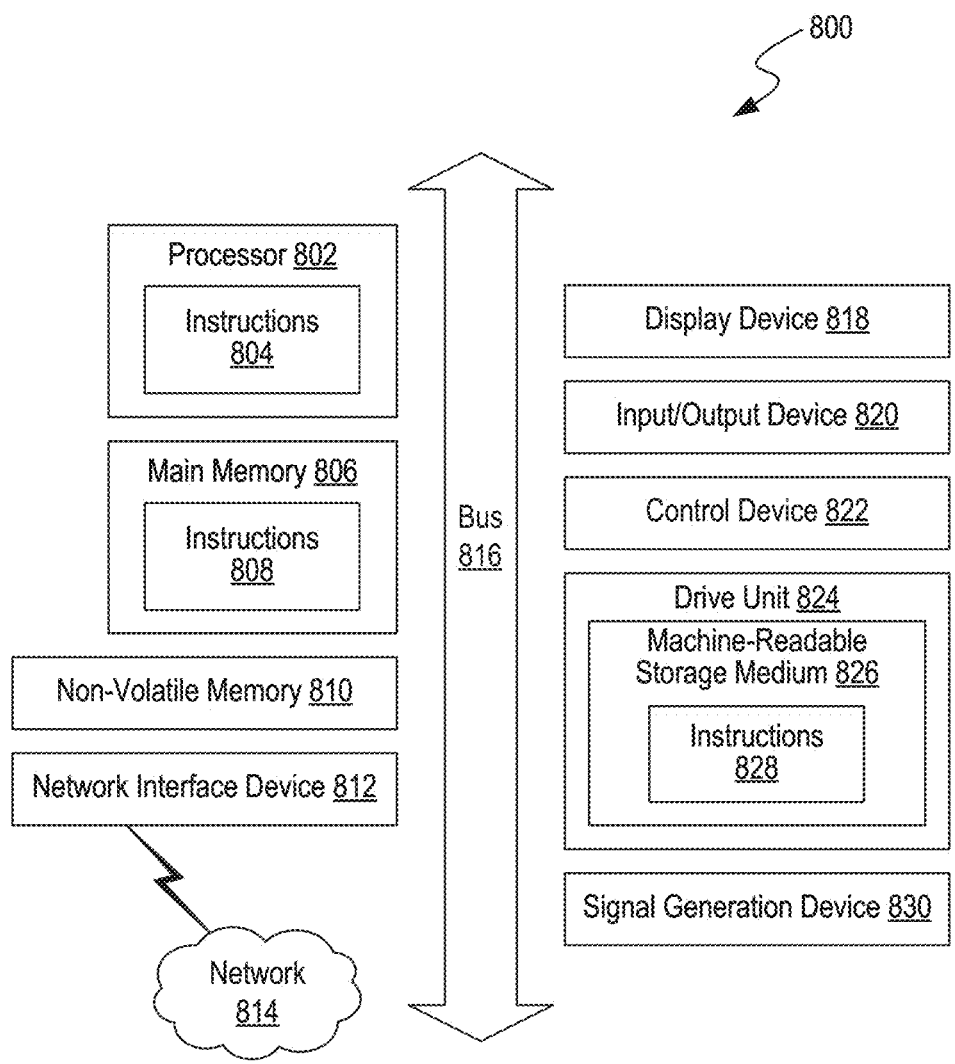
FIG. 8 is a block diagram showing some of the components typically incorporated in at least some of the computer systems and other devices on which the intent-based data generation platform operates in accordance with some implementations of the present technology.

FIG. 8 is a block diagram showing some of the components typically incorporated in at least some of the computer systems and other devices 800 on which the disclosed system operates in accordance with some implementations of the present technology. As shown, an example computer system 800 can include: one or more processors 802, main memory 808, non-volatile memory 812, a network interface device 814, video display device 820, an input/output device 822, a control device 824 (e.g., keyboard and pointing device), a drive unit 826 that includes a machine-readable medium 828, and a signal generation device 832 that are communicatively connected to a bus 818. The bus 818 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computer system 800 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 800. In some implementations, the computer system 800 can be an embedded computer system, a system-on-chip (SOC), a single-board computer system (SBC) or a distributed system such as a mesh of computer systems or include one or more cloud components in one or more networks. Where appropriate, one or more computer systems 800 can perform operations in real-time, near real-time, or in batch mode.

The network interface device 814 enables the computer system 800 to exchange data in a network 816 with an entity that is external to the computing system 800 through any communication protocol supported by the computer system 800 and the external entity. Examples of the network interface device 814 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 808, non-volatile memory 812, machine-readable medium 828) can be local, remote, or distributed. Although shown as a single medium, the machine-readable medium 828 can include multiple media (e.g., a centralized/distributed database and/or associated caches and servers) that store one or more sets of instructions 830. The machine-readable (storage) medium 828 can include any medium that is capable of storing, encoding, or carrying a set of instructions for execution by the computer system 800. The machine-readable medium 828 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 810, 830) set at various times in various memory and storage devices in computing device(s). When read and executed by the processor 802, the instruction(s) cause the computer system 800 to perform operations to execute elements involving the various aspects of the disclosure.

Figure 9:
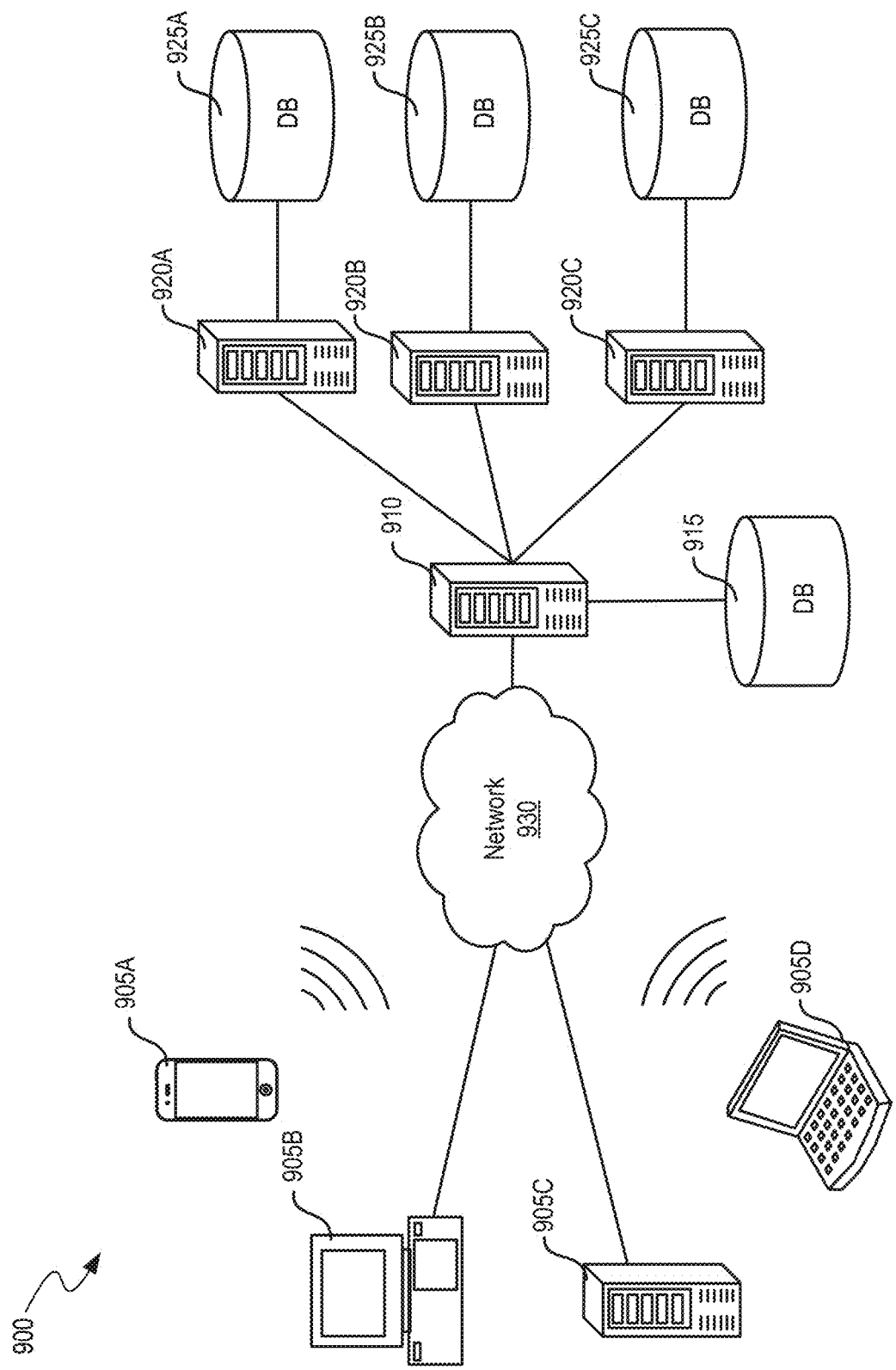
FIG. 9 is a system diagram illustrating an example of a computing environment in which the intent-based data generation platform operates in some implementations of the present technology.

FIG. 9 is a system diagram illustrating an example of a computing environment in which the disclosed system operates in some implementations. In some implementations, environment 900 includes one or more client computing devices 905A-D, examples of which can host the intent-based data generation platform 104 of FIG. 1. Client computing devices 905 operate in a networked environment using logical connections through network 930 to one or more remote computers, such as a server computing device.

In some implementations, server 910 is an edge server which receives client requests and coordinates fulfillment of those requests through other servers, such as servers 920A-C. In some implementations, server computing devices 910 and 920 comprise computing systems, such as the intent-based data generation platform 104 of FIG. 1. Though each server computing device 910 and 920 is displayed logically as a single server, server computing devices can each be a distributed computing environment encompassing multiple computing devices located at the same or at geographically disparate physical locations. In some implementations, each server 920 corresponds to a group of servers.

Client computing devices 905 and server computing devices 910 and 920 can each act as a server or client to other server or client devices. In some implementations, servers (910, 920A-C) connect to a corresponding database (915, 925A-C). As discussed above, each server 920 can correspond to a group of servers, and each of these servers can share a database or can have its own database. Databases 915 and 925 warehouse (e.g., store) information such as claims data, email data, call transcripts, call logs, policy data and so on. Though databases 915 and 925 are displayed logically as single units, databases 915 and 925 can each be a distributed computing environment encompassing multiple computing devices, can be located within their corresponding server, or can be located at the same or at geographically disparate physical locations.

Network 930 can be a local area network (LAN) or a wide area network (WAN), but can also be other wired or wireless networks. In some implementations, network 930 is the Internet or some other public or private network. Client computing devices 905 are connected to network 930 through a network interface, such as by wired or wireless communication. While the connections between server 910 and servers 920 are shown as separate connections, these connections can be any kind of local, wide area, wired, or wireless network, including network 930 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated.

In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A computer-implemented method for generating context-aware responses from large language models (LLM) using semantically chunked information, the computer-implemented method comprising:

retrieving, from a computing device, a set of documents responsive to a prompt in an output generation request;

partitioning the retrieved set of documents into a set of continuous chunks, wherein each continuous chunk of the set of continuous chunks is a section of consecutive data within a predefined size threshold;

mapping each continuous chunk of the set of continuous chunks into a knowledge graph comprising: (i) a set of nodes representing each continuous chunk, and (ii) a set of edges between the set of nodes indicating one or more common attributes between pairs of continuous chunks;

modifying a node in the set of nodes corresponding to each continuous chunk in the knowledge graph by:

determining values of a set of feature variables using a corresponding document of the continuous chunk, wherein the set of feature variables includes at least two of: entities associated with the corresponding document, user role, user seniority, user domain, or previously retrieved documents; and using the values of the set of feature variables, performing one or more of: adding, altering, or removing a corresponding set of edges of the node corresponding to the continuous chunk in the knowledge graph;

generating a set of contextualized chunks of the set of retrieved documents by:

for each pair of nodes in the set of nodes, determining whether the pair of nodes be merged using a number of shared edges between the pair of nodes, and responsive to determining the pair of nodes be merged, mapping corresponding continuous chunks of the pair of nodes to a common contextualized chunk of the set of contextualized chunks; and using the generated set of contextualized chunks and the prompt, generating, by a set of LLMs, a response responsive to the prompt of the output generation request, wherein the response is configured to be displayed at a user interface of the computing device.

2. The computer-implemented method of claim 1, wherein a size of each continuous chunk is determined using a predetermined number of one or more of: words, sentences, or paragraphs within the set of documents.

3. The computer-implemented method of claim 1, wherein the set of feature variables includes one or more patterns of document citations to the prompt by users in specific roles.

4. The computer-implemented method of claim 1, further comprising:
mapping each guideline of a set of guidelines to one or more continuous chunks of the set of continuous chunks,
wherein the generated response indicates the mapped guidelines of the contextualized chunks used to generate the response.

5. The computer-implemented method of claim 1, further comprising:
retrieving (i) a principal document and (ii) a set of amendments on the principal document,
wherein each amendment is mapped to a portion of the principal document, and
wherein the set of amendments is ranked in accordance with a time of each amendment; and
modifying the node corresponding to a particular continuous chunk using amendments in the set of amendments with the time earlier than a time of the continuous chunk.

6. The computer-implemented method of claim 1, further comprising:
retrieving content from one or more external knowledge bases using the common attributes of the set of continuous chunks; and
embedding the retrieved content into the knowledge graph by adding at least one or more of: a set of new nodes or a set of new edges representing the external content.

7. The computer-implemented method of claim 1, further comprising:
using the previously retrieved documents, adding one or more edges in the knowledge graph between one or more continuous chunks within the previously retrieved documents.

8. A non-transitory, computer-readable storage medium for generating context-aware responses from large language models (LLM) using semantically chunked information comprising instructions thereon, wherein the instructions, when executed by at least one data processor of a system, cause the system to:
retrieve, from a computing device, a set of artifacts responsive to a query in an output generation request;
partition the retrieved set of artifacts into a set of continuous chunks, wherein each continuous chunk of the set of continuous chunks is a section of consecutive data within a predefined size threshold;
associate each continuous chunk of the set of continuous chunks with a knowledge graph comprising: (i) a set of nodes representing each continuous chunk, and (ii) a set of edges between the set of nodes indicating one or more common attributes between pairs of continuous chunks;
modify a node in the set of nodes corresponding to each continuous chunk in the determining values of a set of feature variables using a corresponding artifact of the continuous chunk, wherein the set of feature variables includes at least one of: entities associated with the corresponding artifact, user role, user seniority, user domain, or previously retrieved artifacts; and using the values of the set of feature variables, performing one or more of: adding, altering, or removing a corresponding set of edges of the node corresponding to the continuous chunk in the knowledge graph;
generate a set of contextualized chunks of the set of retrieved artifacts by associating corresponding continuous chunks of each pair of nodes in the set of nodes with one or more contextualized chunks of the set of contextualized chunks using a number of shared edges between the pair of nodes; and
use the generated set of contextualized chunks and the query to generate, by the set of LLMs, a response responsive to the query of the output generation request.

9. The non-transitory, computer-readable storage medium of claim 8, wherein a size of each continuous chunk is determined using a predetermined number of one or more of: words, sentences, or paragraphs within the set of artifacts.

10. The non-transitory, computer-readable storage medium of claim 8, wherein the set of feature variables includes one or more patterns of artifact citations to the query by users in specific roles.

11. The non-transitory, computer-readable storage medium of claim 8, wherein the instructions further cause the system to:
associate each guideline of a set of guidelines with one or more continuous chunks of the set of continuous chunks,
wherein the generated response indicates the associated guidelines of the contextualized chunks used to generate the response.

12. The non-transitory, computer-readable storage medium of claim 8, wherein the instructions further cause the system to:
retrieve (i) a principal artifact and (ii) a set of amendments on the principal artifact,
wherein each amendment is associated with a portion of the principal artifact, and
wherein the set of amendments is ranked in accordance with a time of each amendment; and
modify the node corresponding to a particular continuous chunk using amendments in the set of amendments with the time earlier than a time of the continuous chunk.

13. The non-transitory, computer-readable storage medium of claim 8, wherein the instructions further cause the system to:
retrieve content from one or more external knowledge bases using the common attributes of the set of continuous chunks; and
embed the retrieved content into the knowledge graph by adding at least one or more of: a set of new nodes or a set of new edges representing the external content.

14. The non-transitory, computer-readable storage medium of claim 8, wherein the instructions further cause the system to: use the previously retrieved artifacts to add one or more edges in the knowledge graph between one or more continuous chunks within the previously retrieved artifacts.

15. A system for generating context-aware responses from artificial intelligence (AI) models using semantically chunked information comprising:
- at least one hardware processor; and
- at least one non-transitory memory storing instructions, which, when executed by the at least one hardware processor, cause the system to:
  - partition a set of artifacts responsive to a query in an output generation request into a set of continuous chunks wherein each continuous chunk of the set of continuous chunks is a section of consecutive data within a predefined size threshold, and
  - associate each continuous chunk of the set of continuous chunks with a data structure representing: (i) a set of nodes representing each continuous chunk, and (ii) a set of edges between the set of nodes indicating one or more common attributes between pairs of continuous chunks;
  - modify a node in the set of nodes corresponding to each continuous chunk in the data structure by:
    - determining values of a set of feature variables using a corresponding artifact of the continuous chunk, and
    - using the values of the set of feature variables, performing one or more of:
      - adding, altering, or removing a corresponding set of edges of the node corresponding to the continuous chunk in the data structure;
  - generate a set of contextualized chunks of the set of artifacts by associating corresponding continuous chunks of each pair of nodes in the set of nodes with one or more contextualized chunks of the set of contextualized chunks using a number of shared edges between the pair of nodes; and
  - use the generated set of contextualized chunks and the query to generate, by the set of AI models, a response responsive to the query of the output generation request.

16. The system of claim 15, wherein a size of each continuous chunk is determined using a predetermined number of one or more of: words, sentences, or paragraphs within the set of artifacts.

17. The system of claim 15, wherein the set of feature variables includes one or more patterns of artifact citations to the query by users in specific roles.

18. The system of claim 15, wherein the system is further caused to:
- associate each guideline of a set of guidelines with one or more continuous chunks of the set of continuous chunks,
  - wherein the generated response indicates the associated guidelines of the contextualized chunks used to generate the response.

19. The system of claim 15, wherein the system is further caused to:
- retrieve (i) a principal artifact and (ii) a set of amendments on the principal artifact,
  - wherein each amendment is associated to a portion of the principal artifact, and
  - wherein the set of amendments is ranked in accordance with a time of each amendment; and
- modify the node corresponding to a particular continuous chunk using amendments in the set of amendments with the time earlier than a time of the continuous chunk.

20. The system of claim 15, wherein the system is further caused to:
- retrieve content from one or more external knowledge bases using the common attributes of the set of continuous chunks; and
- embed the retrieved content into the data structure by adding at least one or more of:
  - a set of new nodes or a set of new edges representing the external content.

* * * * *